US010552848B2

(12) United States Patent
Soborski

(10) Patent No.: US 10,552,848 B2
(45) Date of Patent: Feb. 4, 2020

(54) METHOD AND SYSTEM FOR DETERMINING WHETHER A BARCODE IS GENUINE USING A DEVIATION FROM AN IDEALIZED GRID

(71) Applicant: SYS-TECH SOLUTIONS, INC., Princeton, NJ (US)

(72) Inventor: Michael L. Soborski, Allentown, NJ (US)

(73) Assignee: SYS-TECH SOLUTIONS, INC., Princeton, NJ (US)

( * ) Notice: Subject to any disclaimer, the term of this patent is extended or adjusted under 35 U.S.C. 154(b) by 0 days.

(21) Appl. No.: 16/528,907

(22) Filed: Aug. 1, 2019

(65) Prior Publication Data

US 2019/0354994 A1 Nov. 21, 2019

Related U.S. Application Data

(63) Continuation of application No. 15/491,523, filed on Apr. 19, 2017, now Pat. No. 10,380,601, which is a
(Continued)

(51) Int. Cl.
*G06K 19/06* (2006.01)
*G06K 9/00* (2006.01)
(Continued)

(52) U.S. Cl.
CPC ......... *G06Q 30/0185* (2013.01); *B42D 25/30* (2014.10); *B42D 25/305* (2014.10);
(Continued)

(58) Field of Classification Search
CPC ....... G06K 19/06028; G06K 19/06037; G06K 7/1404; G06K 7/1408; G06K 7/1452;
(Continued)

(56) References Cited

U.S. PATENT DOCUMENTS

| 5,153,418 A | 10/1992 | Batterman et al. |
| 5,325,167 A | 6/1994 | Melen |

(Continued)

FOREIGN PATENT DOCUMENTS

| CN | 103279731 A | 9/2013 |
| CN | 104428798 A | 3/2015 |

(Continued)

OTHER PUBLICATIONS

PCT Search Report and Written Opinion issued in related application PCT/US2017/022097, dated May 24, 2017, 17 pages.
(Continued)

*Primary Examiner* — Suezu Ellis
(74) *Attorney, Agent, or Firm* — Drinker Biddle & Reath LLP

(57) ABSTRACT

A method for determining whether a candidate barcode is genuine involves acquiring an image of an original barcode, wherein the original barcode includes a plurality of modules; determining, from the image of the original barcode, a deviation of a position of at least one of the plurality of modules of the original barcode from an idealized grid; encoding the deviation as signature data for the original barcode; storing the signature data for the original barcode on a storage device; acquiring an image of the candidate barcode, wherein the candidate barcode includes a plurality of modules; determining, from the image of the candidate barcode, a deviation of a position of at least one of the plurality of modules of the candidate barcode from the idealized grid; retrieving the signature data for the original barcode from the storage device; comparing the signature data for the original barcode with signature data for the candidate barcode; and making a determination that the candidate barcode is genuine or not genuine based on a result of the comparison.

7 Claims, 11 Drawing Sheets

Related U.S. Application Data continuation of application No. 14/561,215, filed on Dec. 4, 2014, now abandoned, which is a continuation of application No. 13/782,233, filed on Mar. 1, 2013, now Pat. No. 8,950,662.

(60) Provisional application No. 61/605,369, filed on Mar. 1, 2012, provisional application No. 61/676,113, filed on Jul. 26, 2012, provisional application No. 61/717,711, filed on Oct. 24, 2012.

(51) Int. Cl.
| | | |
|---|---|---|
| *G06K 9/46* | (2006.01) | |
| *G06T 7/00* | (2017.01) | |
| *G06Q 30/00* | (2012.01) | |
| *G06K 7/10* | (2006.01) | |
| *G06K 5/00* | (2006.01) | |
| *G06K 7/14* | (2006.01) | |
| *G07D 7/0043* | (2016.01) | |
| *B42D 25/305* | (2014.01) | |
| *B42D 25/318* | (2014.01) | |
| *G06K 1/12* | (2006.01) | |
| *G06K 19/08* | (2006.01) | |
| *B42D 25/30* | (2014.01) | |

(52) U.S. Cl.
CPC .......... *B42D 25/318* (2014.10); *G06K 1/121* (2013.01); *G06K 5/00* (2013.01); *G06K 7/10821* (2013.01); *G06K 7/1447* (2013.01); *G06K 9/00577* (2013.01); *G06K 19/06037* (2013.01); *G06K 19/06056* (2013.01); *G06K 19/086* (2013.01); *G06T 7/001* (2013.01); *G07D 7/0043* (2017.05); *G06K 2009/0059* (2013.01)

(58) Field of Classification Search
CPC ...... G06K 7/146; G06K 9/46; G06K 9/00577; G06K 2009/0059; G06T 2201/0064; G06T 2207/30144; G06T 7/0002; G06T 7/0004; G06T 7/0008; G06T 7/001; G07D 7/0043; G07D 7/0051; G07D 7/0054; G07D 7/0055; B42D 25/30; B42D 25/305; B42D 25/318; B42D 25/405

See application file for complete search history.

(56) References Cited

U.S. PATENT DOCUMENTS

| | | | |
|---|---|---|---|
| 5,351,834 A | 10/1994 | Duss | |
| 5,465,303 A | 11/1995 | Levison et al. | |
| 5,521,984 A | 5/1996 | Denenberg et al. | |
| 5,563,401 A | 10/1996 | Lemelson | |
| 5,583,950 A | 12/1996 | Prokoski | |
| 5,673,338 A | 9/1997 | Denenberg et al. | |
| 5,706,091 A | 1/1998 | Shiraishi | |
| 5,883,971 A | 3/1999 | Bolle et al. | |
| 5,903,356 A | 5/1999 | Shiraishi | |
| 5,946,103 A | 8/1999 | Curry | |
| 5,978,495 A | 11/1999 | Thomopoulos et al. | |
| 6,032,861 A | 3/2000 | Lemelson et al. | |
| 6,185,318 B1 | 2/2001 | Jain et al. | |
| 6,398,117 B1 | 6/2002 | Oakeson et al. | |
| 6,421,123 B1 | 7/2002 | Shiraishi | |
| 6,460,766 B1 | 10/2002 | Olschafskie et al. | |
| 6,543,691 B1 | 4/2003 | Lemelson et al. | |
| 6,612,494 B1 | 9/2003 | Outwater | |
| 6,760,472 B1 | 7/2004 | Takeda et al. | |
| 6,865,337 B1 | 3/2005 | Muller | |
| 6,922,480 B2 | 7/2005 | Rhoads | |
| 6,970,236 B1 | 11/2005 | Markantes et al. | |
| 7,025,269 B2 | 4/2006 | Marshall | |
| 7,044,376 B2 | 5/2006 | Nelson et al. | |
| 7,080,041 B2 | 7/2006 | Nagel | |
| 7,089,420 B1* | 8/2006 | Durst ...................... G09C 5/00 713/176 |
| 7,229,025 B2 | 6/2007 | Sussmeier et al. | |
| 7,264,174 B2 | 9/2007 | Chang et al. | |
| 7,277,891 B2 | 10/2007 | Howard et al. | |
| 7,474,773 B2 | 1/2009 | Chau | |
| 7,526,110 B2 | 4/2009 | Niinuma et al. | |
| 7,533,062 B2 | 5/2009 | Sanchez et al. | |
| 7,576,842 B2 | 8/2009 | Park | |
| 7,577,844 B2 | 8/2009 | Kirovski | |
| 7,616,797 B2 | 11/2009 | Bailey et al. | |
| 7,673,807 B2 | 3/2010 | Simske et al. | |
| 7,697,729 B2 | 4/2010 | Howell et al. | |
| 7,752,077 B2 | 7/2010 | Holden et al. | |
| 7,773,812 B2 | 8/2010 | Hanus et al. | |
| 8,027,468 B2 | 9/2011 | McCloskey | |
| 8,061,611 B2 | 11/2011 | Cheung et al. | |
| 8,194,919 B2 | 6/2012 | Rodriguez et al. | |
| 8,267,321 B2 | 9/2012 | Kuyper-Hammond et al. | |
| 8,542,930 B1 | 9/2013 | Negro et al. | |
| 8,950,662 B2 | 2/2015 | Soborski | |
| 9,548,863 B2 | 1/2017 | Weiss | |
| 10,185,907 B2 | 1/2019 | Lau et al. | |
| 2002/0041712 A1 | 4/2002 | Roustaei et al. | |
| 2002/0087869 A1 | 7/2002 | Kim | |
| 2002/0113127 A1 | 8/2002 | Takeuchi et al. | |
| 2002/0122878 A1 | 9/2002 | Kerns et al. | |
| 2002/0171862 A1 | 11/2002 | Nagashige | |
| 2003/0021452 A1 | 1/2003 | Hamid | |
| 2003/0169456 A1 | 9/2003 | Suzaki | |
| 2004/0161153 A1 | 8/2004 | Lindenbaum | |
| 2004/0263911 A1 | 12/2004 | Rodriguez et al. | |
| 2005/0053236 A1 | 3/2005 | Samii et al. | |
| 2005/0161515 A1 | 7/2005 | Lubow | |
| 2005/0226515 A1* | 10/2005 | Endo ................ G06K 19/06037 382/243 |
| 2005/0234857 A1 | 10/2005 | Plutchak et al. | |
| 2005/0257064 A1 | 11/2005 | Boutant et al. | |
| 2007/0041622 A1 | 2/2007 | Salva Calcagno | |
| 2007/0170257 A1 | 7/2007 | Haraszti | |
| 2007/0199991 A1 | 8/2007 | Haraszti et al. | |
| 2008/0025555 A1 | 1/2008 | Visan et al. | |
| 2008/0044096 A1 | 2/2008 | Cowburn et al. | |
| 2008/0149725 A1 | 6/2008 | Rosenbaum | |
| 2008/0181447 A1 | 7/2008 | Adams et al. | |
| 2008/0226297 A1 | 9/2008 | Sinclair et al. | |
| 2009/0001746 A1 | 1/2009 | Brock et al. | |
| 2009/0116753 A1 | 5/2009 | Midgley et al. | |
| 2009/0169019 A1 | 7/2009 | Bauchot et al. | |
| 2009/0232368 A1 | 9/2009 | Niinuma et al. | |
| 2010/0027851 A1 | 2/2010 | Walther et al. | |
| 2010/0037059 A1 | 2/2010 | Sun et al. | |
| 2011/0121066 A1 | 5/2011 | Tian et al. | |
| 2012/0145779 A1 | 6/2012 | Bietenbeck et al. | |
| 2012/0325902 A1 | 12/2012 | Goyal et al. | |
| 2013/0034290 A1 | 2/2013 | Lee et al. | |
| 2013/0228619 A1 | 9/2013 | Soborski | |
| 2013/0240628 A1 | 9/2013 | van der Merwe et al. | |
| 2013/0296039 A1 | 11/2013 | Engineer et al. | |
| 2014/0061316 A1 | 3/2014 | Narayanaswami et al. | |
| 2014/0078556 A1 | 3/2014 | Anderson, III | |
| 2014/0086474 A1 | 3/2014 | Le | |
| 2015/0061279 A1 | 3/2015 | Cruz et al. | |
| 2015/0083801 A1 | 3/2015 | Soborski | |
| 2015/0098655 A1 | 4/2015 | Chang et al. | |
| 2015/0262347 A1 | 9/2015 | Duerksen et al. | |
| 2015/0379321 A1 | 12/2015 | Soborski et al. | |
| 2016/0342885 A1 | 11/2016 | Toedtli et al. | |
| 2016/0371303 A1 | 12/2016 | Voigt et al. | |
| 2017/0091611 A1 | 3/2017 | Soborski | |
| 2017/0177962 A1* | 6/2017 | Yamazaki ................ B41J 29/46 |

(56) References Cited

U.S. PATENT DOCUMENTS

| | | | |
|---|---|---|---|
| 2017/0287147 | A1 | 10/2017 | Takahashi et al. |
| 2018/0178579 | A1 | 6/2018 | Chen et al. |

FOREIGN PATENT DOCUMENTS

| | | | |
|---|---|---|---|
| EP | 1 494 135 | A2 | 1/2005 |
| GB | 2221870 | A | 2/1990 |
| JP | 2004-109172 | A | 4/2004 |
| JP | 2005-267598 | A | 9/2005 |
| JP | 2009-109419 | A | 5/2009 |
| JP | 2009-124599 | A | 6/2009 |
| JP | 2012-039494 | A | 2/2012 |
| JP | 2012-141729 | A | 7/2012 |
| JP | 2014-203289 | A | 10/2014 |
| JP | 2016-028363 | A | 2/2016 |
| JP | 2017-516214 | A | 6/2017 |
| JP | 2017-532670 | A | 11/2017 |
| KR | 10-2003-0051712 | A | 6/2003 |
| KR | 10-2005-0093715 | A | 9/2005 |
| KR | 10-2008-0031455 | A | 4/2008 |
| RU | 2 208 248 | C2 | 7/2003 |
| RU | 2 370 377 | C2 | 10/2009 |
| RU | 2 380 750 | C2 | 1/2010 |
| RU | 2 451 340 | C2 | 5/2012 |
| RU | 2 458 395 | C2 | 8/2012 |
| RU | 2 461 883 | C2 | 9/2012 |
| RU | 2 476 936 | C2 | 2/2013 |
| RU | 2 507 076 | C2 | 2/2014 |
| WO | 96/03714 | A1 | 2/1996 |
| WO | 97/24699 | A1 | 7/1997 |
| WO | 02/31752 | A1 | 4/2002 |
| WO | 02/065782 | A1 | 8/2002 |
| WO | 2005/015487 | A1 | 2/2005 |
| WO | 2008/078009 | A1 | 7/2008 |
| WO | 2009/044352 | A1 | 4/2009 |
| WO | 2009/115611 | A2 | 9/2009 |
| WO | 2010/021965 | A1 | 2/2010 |
| WO | 2011/076406 | A1 | 6/2011 |
| WO | 2011/077459 | A1 | 6/2011 |
| WO | 2013/119235 | A1 | 8/2013 |
| WO | 2013/130946 | A1 | 9/2013 |
| WO | 2015/130697 | A1 | 9/2015 |
| WO | 2016/035774 | A1 | 3/2016 |

OTHER PUBLICATIONS

PCT Search Report and Written Opinion issued in related application PCT/US2017/064900, dated Jan. 12, 2018, 8 pages.
Search Report issued in related application RU 2016138293/08, dated Feb. 7, 2017, with English language translation, 4 pages.
Decision to Grant issued in related application RU 2018101250, dated Apr. 19, 2018, with English language translation, 22 pages.
Decision to Grant issued in related application RU 2017132260, dated Jan. 10, 2018, with English language translation, 27 pages.
Decision to Grant issued in related application RU 2018136107, dated Jan. 16, 2019, with English language translation, 30 pages.
Ahmed et al., "The structural microscopically analysis for the full color printers & copiers utilized in valuable secured prints counterfeiting crimes," WAN-IFRA, Mar. 3, 2011, 13 pages.
Deguillaume et al., "Secure hybrid robust watermarking resistant against tampering and copy-attack," Signal Processing, 2003, vol. 83(10), pp. 2133-2170.
"Rank, v.3", Def. 3a, OED Online, Oxford English Dictionary, 2nd Ed., 1989, Oxford University Press, <http://www.oed.com/oed2/00197225>.
Seo et al., "A robust image fingreprinting system using the Radon transform," Signal Processing: Image Communication, Elsevier Science Publishers, Amsterdam, NL, Apr. 1, 2004, vol. 19 (4), pp. 325-339.
Wikipedia, "Discrete wavelet transform," Nov. 27, 2016, <https://en.wikipedia.org/w/index.php?title=Discrete_wavelet_transform&oldid=751698489>, 10 pages.
Examination Report issued in related application AU 2015383137, dated Aug. 18, 2017, 3 pages.
Notice of Acceptance issued in related application AU 2015223174, dated Aug. 18, 2017, 3 pages.
Notice of Acceptance issued in related application AU 2015383137, dated Nov. 24, 2017, 3 pages.
Notice of Acceptance issued in related application AU 2016278954, dated May 9, 2018, 3 pages.
Examination Report issued in related application AU 2016278954, dated Jan. 31, 2018, 6 pages.
Examination Report issued in related application AU 2017234124, dated Sep. 25, 2018, 2 pages.
Notice of Acceptance issued in related application AU 2017234124, dated Nov. 13, 2018, 3 pages.
Examination Report issued in related application AU 2017370656, dated Jul. 18, 2019, 5 pages.
Office Action issued in related application CA 2,960,716, dated Apr. 13, 2017, 4 pages.
Office Action issued in related application CA 2,960,716, dated Dec. 27, 2017, 5 pages.
Office Action issued in related application CN 201580076348.1, dated Mar. 15, 2018, with English language translation, 16 pages.
Office Action issued in related application CN 201580062910.5, dated Jan. 30, 2018, with English language translation, 9 pages.
Office Action issued in related application CN 201780017503.1, dated Apr. 29, 2019, with English language translation, 10 pages.
Office Action issued in related application CN 201580022895.1, dated Sep. 21, 2018, with English language translation, 23 pages.
Extended European Search Report issued in related application EP 15755854.5, dated Feb. 27, 2017, 11 pages.
Supplementary European Search Report issued in related application EP 15844793.8, dated Sep. 13, 2017, 4 pages.
Examination Report issued in related application EP 15844793.8, dated Oct. 6, 2017, 8 pages.
Supplementary European Search Report issued in related application EP 15882884.8, dated Dec. 14, 2017, 4 pages.
Third Party Observation filed in related application EP 13754659.4, Nov. 3, 2017, 3 pages.
Extended European Search Report issued in related application EP 16812194.5, dated May 11, 2018, 7 pages.
Extended European Search Report issued in related application EP 13754659.4, dated Oct. 10, 2015, 7 pages.
Examination Report issued in related application EP 15882884.8, dated Jan. 23, 2018, 7 pages.
Supplementary European Search Report issued in related application EP 17767261.5, dated Mar. 6, 2019, 4 pages.
Examination Report issued in related application EP 17767261.5, dated Mar. 14, 2019, 8 pages.
Examination Report issued in related application EP 16812194.5, dated Jun. 7, 2019, 5 pages.
Office Action issued in related application IL 256161, dated May 31, 2018, with partial English language translation, 3 pages.
Office Action issued in related application IL 253685, dated Jan. 6, 2018, with English language translation, 6 pages.
Examination Report issued in related application IN 7110/DELNP/2014, dated Feb. 25, 2019, 6 pages.
Office Action issued in related application JP 2016-565026, dated Feb. 3, 2017, with English language translation, 12 pages.
Office Action issued in related application JP 2017-515692, dated Aug. 2, 2017, with English language translation, 5 pages.
Office Action issued in related application JP 2017-564394, dated May 14, 2018, with English language translation, 4 pages.
Office Action issued in related application JP 2017-541598, dated Mar. 7, 2018, with English language translation, 4 pages.
Decision to Grant Patent issued in related application JP 2017-515692, dated Jan. 10, 2018, with English language translation, 6 pages.
Notice of Allowance issued in related application JP 2017-564394, dated Oct. 31, 2018, with English language translation, 6 pages.
Office Action issued in related application JP 2018-544333, dated Jan. 31, 2019, with English language translation, 4 pages.
Office Action issued in related application KR 10-2017-7026160, dated Nov. 21, 2017, with English language translation, 11 pages.

(56) References Cited

OTHER PUBLICATIONS

Office Action issued in related application KR 10-2015-7020798, dated Jul. 11, 2016, with English language translation, 14 pages.
Office Action issued in related application KR 10-2017-7026160, dated Feb. 22, 2018, with English language translation, 19 pages.
Office Action issued in related application KR 10-2018-7001086, dated Feb. 22, 2018, with English language translation, 15 pages.
Notice of Allowance issued in related application KR 10-2018-7029209, dated Mar. 7, 2019, with English language translation, 3 pages.
Examination Report issued in related application MY PI2014002470, dated Nov. 15, 2017, 3 pages.
Examination Report issued in related application MY PI2016001571, dated Apr. 25, 2019, 3 pages.
Office Action issued in related application MX/2019/009648, dated Mar. 8, 2019, with machine generated English language translation, 7 pages.
PCT Search Report and Written Opinion issued in related application PCT/US2015/051517, dated Jan. 11, 2016, 10 pages.

* cited by examiner

*Low res* -------------------------------------------------------------------------------> *High res*
Module pigmentation -> Module Position Bias -> Void/Mark Locations -> Edge Shape Projection

METHOD AND SYSTEM FOR DETERMINING WHETHER A BARCODE IS GENUINE USING A DEVIATION FROM AN IDEALIZED GRID

CROSS-REFERENCE TO RELATED APPLICATIONS

The present application is a continuation of U.S. patent application Ser. No. 15/491,523, filed Apr. 19, 2017, now U.S. Pat. No. 10,380,601, which is a continuation of U.S. patent application Ser. No. 14/561,215, filed Dec. 4, 2014, now abandoned, which is a continuation of U.S. patent application Ser. No. 13/782,233, filed Mar. 1, 2013, now U.S. Pat. No. 8,950,662, which claims priority to U.S. Provisional Patent Application No. 61/605,369, filed Mar. 1, 2012; U.S. Provisional Patent Application No. 61/676,113, filed Jul. 26, 2012; and U.S. Provisional Patent Application No. 61/717,711, filed Oct. 24, 2012. The disclosures of each of these applications are incorporated herein by reference.

TECHNICAL FIELD

The present disclosure is generally directed to machine vision devices and methods and, more particularly, the use of such devices and methods for verifying items.

BACKGROUND

Some currently existing methods of uniquely identifying items are based on overt or covert marks deliberately applied to items, usually by printing. Other methods rely on natural variations in a material substrate (fiber orientation in paper for example) to be used as a unique identifier. Current methods have significant deficiencies, however. These include the need to deliberately add overt or covert marks to the item in addition to any marks already present on the item for other purposes. The substrate variation method, for example, requires a specialized system that perceives the variations to be necessary. Also, for substrates that do not present a readily identifiable unique feature (some plastic films, for example) this method cannot be employed. These deficiencies seriously reduce the utility of these methods in the technical fields considered herein.

DRAWINGS

While the appended claims set forth the features of the present techniques with particularity, these techniques may be best understood from the following detailed description taken in conjunction with the accompanying drawings of which:

DESCRIPTION

Figure 1:
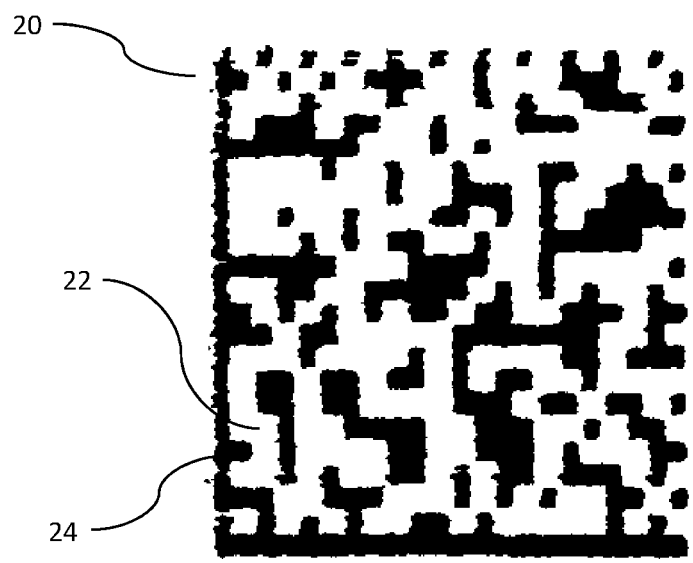
FIG. 1 is an illustration of an instance of a printed mark made use of by methods embodying the present disclosure.

Turning to the drawings, wherein like reference numerals refer to like elements, techniques of the present disclosure are illustrated as being implemented in a suitable environment. The following description is based on embodiments of the claims and should not be taken as limiting the claims with regard to alternative embodiments that are not explicitly described herein.

The present disclosure teaches utilizing natural variations in marked features on an item as a way of establishing information or data specific to that item, which may be referred to as a "signature" or an "original item identifier," storing the information separately from the item, and subsequently accessing the stored information to validate the identity of an item that is alleged to be the original item. The deliberate application of covert or overt identifying marks on the item is not required, although it can be used in some embodiments. Instead, the natural variations inherent in many manufacturing, marking, or printing processes can be exploited to extract identifying features of an item or a mark, such as one of many types of marks applied to items. Further, this approach easily integrates into existing reader systems for applied marks, such as bar code readers or machine vision systems; no specialized systems are needed to perceive variations in a material substrate sufficient to identify an item.

Embodiments of the disclosure provide methods, apparatus, and computer programs (which may be stored on a non-transitory tangible storage medium) for verifying an identity of an item, comprising: examining an original item for original artifacts specific to the original item; extracting information associated with the original artifacts; ranking the information according to a characteristic of the respective artifact; and storing the ranked information in a non-transitory computer readable storage device separate from the original item.

The artifacts may be features of the item that were produced when the item was produced. At least some of the artifacts may be not controllably producible in producing the item. The characteristic by which the original artifacts are ranked may be a magnitude, for example, a size of an artifact. The ranked original artifacts' information (information associated with the original artifacts) may be encoded into computer readable data corresponding to the original item to form a signature.

Embodiments of the disclosure provide methods, apparatus, and computer programs (which may be stored on a non-transitory tangible storage medium) for verifying an identity of an item, comprising: examining a mark that comprises an identifier and an artifact, wherein the identifier is associated with an original item and the artifact does not alter the association; extracting information associated with the artifact; and storing the information in a non-transitory computer readable storage device separate from the original item so as to be at least partially locatable using the identifier.

Respective information from a plurality of said marks may be stored in one storage device, for example in the form of a database, and using the identifier from one of said marks, the respective information from a number of marks smaller than said plurality of marks and comprising said one mark may be retrievable. In an example, the identifier may identify a group or category of items. The identifier can then be used to retrieve from the database only the stored information relating to items in that group or category, reducing the extent of a subsequent search to identify the information on a single item. In another example, the smaller number of marks may be only the one mark. For example, the identifier may be a Unique Identifier (UID) that explicitly identifies only a single item, and the information may be stored so as to be retrievable using the UID.

Embodiments of the present invention provide methods, apparatus, and computer programs (which may be stored on a non-transitory tangible storage medium) for verifying an identity of an item, comprising: examining an original item for original artifacts specific to the original item; storing information associated with the original artifacts and information associated with at least one of apparatus involved in creating the original artifacts and apparatus involved in examining the original item in a non-transitory computer readable storage device separate from the original item.

The stored information may include information indicative of a type of the apparatus involved in creating the original artifacts. The stored information may include information indicative of a resolution of the apparatus involved in examining the original item.

Embodiments of the disclosure provide methods, apparatus, and computer programs (which may be stored on a non-transitory tangible storage medium) for verifying the identity of an item, comprising: examining an unverified item for unverified artifacts specific to the unverified item; extracting information representing the unverified artifacts; retrieving from a storage device stored data containing information representing original artifacts of an original item; recovering the original artifacts' information from the stored data; comparing the unverified and original artifacts' information to determine whether the unverified artifacts' information (information associated with the unverified artifacts) matches the original artifacts' information; and in the case the unverified artifacts' information matches the original artifacts' information, verifying the unverified item as a verified original item; wherein the comparing includes correcting for properties of at least one of apparatus involved in the creation of the original artifacts, apparatus involved in the examination of the original item for the information representing the original artifacts, and apparatus involved in the examination of the unverified item for the information representing the unverified artifacts.

The stored data may include information relating to at least one of the apparatus involved in the creation of the original artifacts and the apparatus involved in the examination of the original item.

The correcting may comprise comparing resolutions or other properties of the apparatus involved in examining the original item and the apparatus involved in examining the unverified item, and discounting artifacts detected by one of those apparatuses that would not be reliably detected by the other of those apparatuses. Where the two apparatuses have different resolutions, artifacts that are larger than the resolution limit of one apparatus, and are detected by that apparatus, but are smaller than the resolution limit of the other apparatus, may be discounted. The weighting may be based on a characteristic resolving power and imaging fidelity of the verification device versus corresponding characteristics of the original imaging device.

Where the artifacts are of distinct categories, determining whether the unverified artifacts' information matches the original artifacts' information may comprise comparing the detected artifacts in each category and combining the results of the comparisons, and the correcting may then comprise weighting the combining according to a known tendency of the apparatus that created the original artifacts to produce artifacts in different categories with different frequencies or different magnitudes.

Embodiments of the disclosure provide methods, apparatus, and computer programs (which may be stored on a non-transitory tangible storage medium) for verifying the identity of an item, comprising: examining an original item having on it an original symbol comprising an array of differently colored printed cells for original artifacts specific to the original symbol, wherein: the artifacts are features of at least some of the cells that were produced when the original symbol was produced; and at least some of the artifacts were not controllably producible in producing the original symbol; and the artifacts comprise at least one category of artifact selected from the group consisting of deviation in average color of a cell from an average derived from within the mark, which may be an average for neighboring cells of the same nominal color, bias in position of a cell relative to a best-fit grid of neighboring cells, areas of a different one of at least two colors from a nominal color of the cells, and deviation from a nominal shape of a long continuous edge; extracting information representing the original artifacts for each cell; encoding the original artifacts' information into computer readable data corresponding to the original item; and storing the data in a non-transitory computer readable storage device separate from the original item.

In general, different "colors" may differ in lightness, hue, or both, and may be distinguished by differences in lightness, hue, or both. For example, where the symbol is printed in an ink or other medium of a single first color on a substrate of a single second color, any measure that distinguishes the first color from the second color may be used. In the commonest case, commonly called "black and white" or "monochrome," the printing medium is blackish, the paper is whitish, and a difference in albedo is used to distinguish them. However, in other circumstances, for example, in printing with more than one color of ink, it may be desirable or even necessary to measure differences in hue instead of, or in addition to, differences in brightness.

Embodiments of the disclosure provide methods, apparatus, and computer programs (which may be stored on a non-transitory tangible storage medium) for verifying the identity of an item, comprising: examining an original item for original artifacts specific to the original item; extracting information associated with the original artifacts; ranking the original artifacts' information according to a characteristic of the artifact; calculating an autocorrelation series of the ranked original artifacts' information; and storing data related to the autocorrelation series in a non-transitory computer readable storage device separate from the original item.

Embodiments of the disclosure provide methods, apparatus, and computer programs (which may be stored on a non-transitory tangible storage medium) for verifying the identity of an item, by: examining an original item for original artifacts specific to the original item, wherein the artifacts are features of the item that were produced when the item was produced, and at least some of the artifacts were not controllably producible in producing the item; extracting information representing the original artifacts; encoding the original artifacts' information into computer readable data corresponding to the original item; and storing the data in a non-transitory computer readable storage device separate from the original item.

Embodiments of the disclosure provide methods, apparatus, and computer programs (which may be stored on a non-transitory tangible storage medium) for verifying the identity of an item, comprising: defining a plurality of modules on an original item and an order of the modules; examining the modules on the original item for a plurality of categories of original artifacts specific to the original item, wherein the artifacts are features of the item that were produced when the item was produced, and at least some of the artifacts were not controllably producible in producing the item; extracting information representing the original artifacts; encoding for each module in order which categories of artifact are present and which categories of artifact are absent to form computer-readable data; and storing the data in a non-transitory computer readable storage device separate from the original item.

Embodiments of the disclosure provide methods, apparatus, and computer programs (which may be stored on a non-transitory tangible storage medium) for verifying the identity of an item, comprising: examining an unverified item for one or more unverified artifacts specific to the unverified item; extracting information representing the unverified artifacts; retrieving stored data relating to one or more artifacts of an original item from a storage device; recovering the original artifacts' information from the retrieved stored data; comparing the unverified and original artifacts' information to determine whether the unverified artifacts' information matches the original artifacts' information; and in the case the unverified artifacts' information matches the original artifacts' information, verifying the unverified item as a verified original item. The processing of the unverified item, or the processing of the original item, is in accordance with any of the aspects and embodiments of the present invention. It may be preferred to process both the unverified and the original item by fairly similar processes, to reduce the level of error and uncertainty introduced by differences between the processes used.

Embodiments of the disclosure provide methods, apparatus, and computer programs (which may be stored on a non-transitory tangible storage medium) for verifying the identity of an item, comprising: examining an unverified item for unverified artifacts specific to the unverified item; extracting information representing the unverified artifacts; ranking the unverified artifacts' information according to a characteristic of the artifact; calculating an autocorrelation series of the ranked unverified artifacts' information; retrieving an autocorrelation series representing artifacts of an original item from a storage device; comparing the unverified and original autocorrelation series to determine whether the unverified artifacts' information matches the original artifacts' information; and in the case the unverified artifacts' information matches the original artifacts' information, verifying the unverified item as a verified original item.

Embodiments of the disclosure provide methods, apparatus, and computer programs (which may be stored on a non-transitory tangible storage medium) for verifying the identity of an item, by: examining an unverified item for unverified artifacts specific to the unverified item; extracting information representing the unverified artifacts; retrieving data comprising original artifacts' information from a storage device; recovering original artifacts' information from the retrieved data; comparing the unverified and original artifacts' information; and in the case the unverified artifacts' information matches the original artifacts' information, verifying the unverified item as a verified original item.

Embodiments of the disclosure provide methods, apparatus, and computer programs (which may be stored on a non-transitory tangible storage medium) for verifying the identity of an item, by successively carrying out any of the above processes for generating and storing data or information, and any appropriate above process for comparing an unverified item with stored data or information.

Embodiments of the disclosure provide methods, apparatus, and computer programs (which may be stored on a non-transitory tangible storage medium) for verifying the identity of an item combining features of any two or more of the above methods, apparatus, and computer programs.

Ranking the original artifacts' information may include treating artifacts with a characteristic below a threshold value differently from artifacts above the threshold. For example, artifacts smaller than the threshold may not be ranked, or may be grouped together with locations where no artifact is detected, or may be discounted. The threshold may be chosen with consideration for a noise threshold of the artifacts and the apparatus used to detect them, below which artifacts cannot reliably be detected or cannot reliably be quantified. In an embodiment, ranking may consist simply of separating artifacts above the threshold from artifacts below the threshold or entirely absent. However, in many embodiments it is preferred that the characteristic is quantifiable and the ranking comprises ordering the artifacts according to a magnitude or quantity of the characteristic.

The method may comprise extracting information representing a plurality of different categories of artifact, and ranking may then comprise ranking the original artifacts' information separately for each category of artifact.

The method may comprise defining a plurality of predetermined locations on the original item, and extracting information representing the artifacts may then comprise associating each artifact with one of the predetermined locations. Wherein the original item bears a printed symbol comprising a plurality of cells, the predetermined locations may be at least some of the plurality of cells, and the artifacts may then be artifacts of the printing of the cells. Where practical, it is usually preferred to use the entire symbol, in order to maximize the number of available artifacts. However, that is not always necessary. For example, if the symbol has a large number of cells and a high incidence of usable artifacts, a smaller group of cells may be used. In an embodiment, six categories of artifact, with 100 artifacts of each category, ranked by magnitude within each category, have been found to give a robust result.

The artifacts may comprise at least one category of artifact selected from the group of categories consisting of deviation in average color of a cell from the average for neighboring cells of the same nominal color; bias in position of a cell relative to a best-fit grid of neighboring cells; areas of a different color from a nominal color of the cell within which they appear; and deviation from a nominal shape of a long continuous edge.

Producing the original item may comprise applying a mark to the original item, and the artifacts may then be features of the mark. "Producing the original item" may include every stage before examining begins, and the mark may be applied in a separate step at any time between when production of the original item begins and immediately before examining.

Where the item or mark is printed, the artifacts may comprise imperfections or other variations in printing. Where the printed mark conveys information, the imperfections may be too small to materially affect the readability of the information. Producing the item may further comprise causing additional random or quasi-random features usable as said artifacts to be produced in the printing. The extracting of information may further comprise determining a type of printer used in producing the artifacts, where the artifacts are of a plurality of distinct categories. Encoding the ranked original artifacts' information and storing may then comprise at least one of ranking different categories of artifacts according to the type of printer, and storing data indicating the type of printer as part of the stored data. The information may be useful, because different types of printers can produce different categories of artifacts with different magnitude ranges, more or less frequently, or with other variations that may affect how to assess or how much weight to give to different categories of artifact.

Other information relating to the original item may be incorporated in the stored data in addition to the information representing the original artifacts. The other original item information may include a serial number specific to the original item. Such other information may then be recovered from the retrieved stored data additionally to the information representing the original artifacts.

Where at least some of the artifacts are artifacts of a symbol that encodes data, and the encoded data include a UID for an individual instance of the symbol or other identifying data, the stored data may be stored so as to be retrievable under an identifier derivable from the UID or other identifying data. Where the other identifying data only partially identifies the symbol, for example, identifies a category or group of items smaller than all the items for which data is stored in a database, the data may be stored so that the stored data for the category or group are retrievable under an identifier derivable from the other identifying data. The stored data for a desired individual original item may then be retrieved by a further search within the retrieved group.

Determining may comprise assessing a statistical probability that the unverified artifacts' information matches the original artifacts' information. It may then be determined that the unverified artifacts' information matches the original artifacts' information when the unverified artifacts' information and the original artifacts' information are within a predetermined percentage of each other.

In the case the statistical probability exceeds a first threshold, it may be determined that the unverified item is a verified original item. In the case the statistical probability is below a second threshold lower than the first threshold, it may be determined that the unverified item is not an original item. In the case the statistical probability is between the first and second thresholds, it may then be reported that it cannot be determined whether the unverified item is an original item.

In assessing the statistical probability, greater weight may be given to artifacts of greater magnitude.

Comparing the artifacts' information may include detecting artifacts that are present in one of the original item and the unverified item, and absent in the other of the original item and the unverified item. The presence of an artifact in the unverified item that was not present in the original item, absent an indication that the item has been damaged in the meantime, may be as significant as the presence of an artifact in the original item that is not present in the unverified item.

In general, "discounting" an artifact includes considering that artifact with lower statistical ranking than otherwise comparable artifacts, considering that artifact in a separate class of artifacts that cannot be accurately quantified and/or ranked, considering that artifact in the same way as a location with no detected artifact of that category, and totally ignoring that artifact. Different ones of those approaches may be applied at different points even within a single embodiment.

Where at least some of the artifacts are artifacts of a symbol that encodes data and supports error detection, extracting information representing the unverified artifacts may include determining an error state of the symbol containing the unverified artifacts. Where the error state indicates that part of the symbol is damaged, the comparing may then comprise discounting artifacts in the damaged part of the symbol.

Prior to the storing step, the original item may be partitioned into a plurality of original zones. Each of at least a portion of the original artifacts may then be associated with the original zone in which it is located. Information representing the associated original artifacts and their respective original zones in the stored data may be preserved. The unverified item may then be partitioned into at least one available unverified zone corresponding to fewer than all of the original zones. Each of at least a portion of the unverified artifacts may be associated with the available unverified zone in which it is located. Information representing the original artifacts and the associated original zones that correspond to the available unverified zones may be recovered from the retrieved stored data. In the comparing step, only the information representing the original artifacts and the associated original zones that correspond to the available unverified zones may be used.

The original item may be attached to an object to form an original object, prior to the step of examining an unverified item; and in the case the unverified artifacts' information matches the original artifacts' information, an object to which the unverified item is attached may then be verified as a verified original object.

The magnitude of a deviation in average color may be normalized by reference to a difference between average colors for neighboring cells of at least two nominal colors. The magnitude of bias in position of a cell relative to a best-fit grid of neighboring cells may be normalized by reference to the size of the cells. The magnitude of areas of the opposite color from a nominal color of the cells may be determined by the size of the areas, normalized by reference to the size of the cells. The magnitude of deviation from a nominal shape of a long continuous edge may be normalized by reference to a best fit straight line or other smooth curve.

Where encoding the ranked original artifacts' information comprises calculating an autocorrelation series of the ranked original artifacts' information, encoding may further comprise representing or approximating the autocorrelation series as a polynomial to a fixed order and using the polynomial coefficients to form the stored data. The approximation may be to a polynomial of a predetermined order, and the coefficients may be approximated to a predetermined precision.

Where encoding the ranked original artifacts' information comprises calculating an autocorrelation series of the ranked original artifacts' information, comparing may comprise calculating an autocorrelation series of the unverified artifacts' information, and comparing the two autocorrelation series. Comparing may further or alternatively comprise comparing Discrete Fourier Transform (DFT) power series of the two autocorrelation series, and may then comprise comparing at least one of the Kurtosis and Distribution Bias functions of the DFT power series.

According to embodiments of the invention, there is provided an apparatus or system for verifying the identity of an item, comprising: an original item scanner operable to examine an original item and extract information representing original artifacts of the original item, by the method of any one or more of the mentioned embodiments and aspects of the invention; an encoder operable to encode the extracted information into a computer readable item identifier; and a computer readable storage device operable to store the item identifier.

According to embodiments of the disclosure, there is provided an apparatus or system for verifying the identity of an item by the method of any one or more of the mentioned embodiments and aspects of the invention, comprising: a verifying scanner operable to examine an unverified item and extract information representing unverified artifacts of the unverified item; and a processor operable to retrieve a stored item identifier from a storage device, recover original artifacts' information from the retrieved item identifier, compare the unverified and original artifacts' information, and produce an output dependent on the result of the comparison.

According to embodiments of the disclosure, there is provided an apparatus or system for verifying the identity of an item, comprising in combination the above described apparatus or system for creating and storing an item identifier, and the above described apparatus or system for examining and comparing an unverified item.

The verifying scanner may be coupled to a point of sale device. The verifying scanner may be embodied in a cell phone.

The system may further comprise an original item producer operable to produce an original item, wherein the artifacts are features of the item that are produced when the original item producer produces the item, and at least some of the artifacts are not controllably producible by the original item producer.

The original item producer may be operative to intentionally produce or enhance at least some of the artifacts.

The original item producer may comprise an original mark applier that applies a mark to the original item, with the artifacts then being features of the mark.

The original item producer may comprise a printer, with at least some of the artifacts then comprising variations or imperfections in the printing.

The system may further comprise at least one original item for which the item identifier is stored in the computer readable storage device.

In various embodiments, the artifacts may be features of the item itself, or of a mark that has been applied to the item. The item may be the thing that is ultimately to be verified, or may be appended (typically but not necessarily in the form of a label) to an object that is to be verified. Where the object, the item, or the mark involves printing, some or all of the artifacts may be variations or imperfections in the printing. "Verifying the identity of an item" may include verifying that printing or other mark applied to an item, or an item appended to an object, has not been altered or replaced, even if the underlying item or object is original. For example, it may be desired to verify that an expiry date, serial number, or other tracking or identification data has not been tampered with.

In many embodiments, it is preferred that the artifacts be features that do not affect, or at least do not diminish, the function or commercial value of the mark, item, or object in which they appear.

Another aspect of the disclosure provides original items, including original objects comprising objects to which original items have been attached, for which signature data have been stored in the storage device of a system according to another aspect of the invention.

An embodiment of the disclosure is a method that operates on marks that are applied to items. These marks may be for the purpose of uniquely identifying an item, as with a serial number, for example, or they may be marks that are used for other purposes, such as branding, labeling or decoration. These marks may be printed, etched, molded, formed, transferred, or otherwise applied to the item using various processes. The marks are acquired such that they can be processed in electronic form. Possible devices that may be used for electronic acquisition of the marks include machine vision cameras, bar code readers, line scan imagers, flatbed scanners, and hand-held portable imaging devices.

Referring now to the drawings, in FIG. 1 there is shown an example of a printed mark 20 to which various methods described herein may be applied. In this example the printed mark 20 is a 2-dimensional barcode. This barcode is a data-carrier of information, where the information is encoded as a pattern of light areas 22 and dark areas 24 of the printed mark 20. A possible implementation of the 2-D barcode includes a rectangular grid, with each cell or "module" 22, 24 in the grid either black or white, representing a bit of data.

Figure 2:
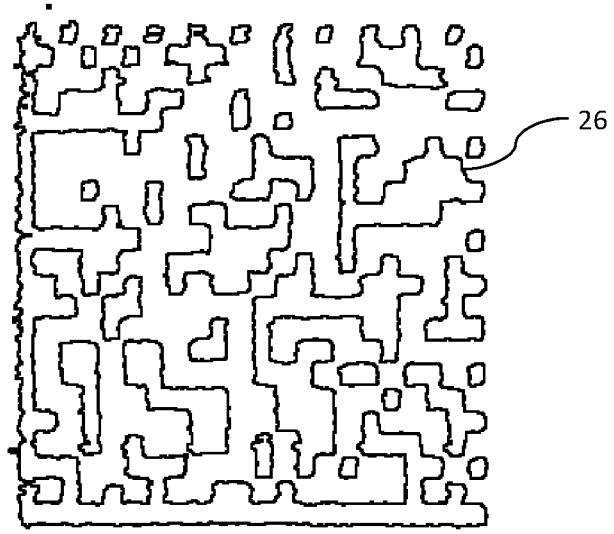
FIG. 2 is an illustration of the mark in FIG. 1 with the mark's edge features extracted for clarity.

FIG. 2 provides an enhanced view of some of the variations present in the mark shown in FIG. 1. FIG. 2 shows only the edges 26 between light and dark areas of the mark shown in FIG. 1. Features such as edge linearity, region discontinuities, and feature shape within the mark shown in FIG. 1 are readily apparent. Numerous irregularities along the edges of the mark's printed features are clearly visible. Note that this illustration is provided for clarity and is not necessarily a required processing step. In some embodiments, such edge extraction is beneficial and therefore utilized. In some embodiments, features other than edges are extracted.

Figure 3:
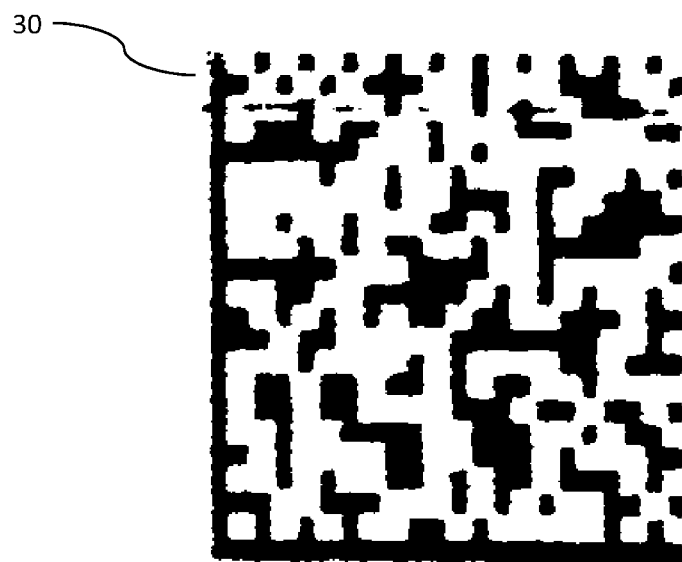
FIG. 3 is an illustration of a second instance of the same mark as in FIG. 1, which may represent a counterfeit version of the mark in FIG. 1.

FIG. 3 shows an example of a second printed mark 30, which may represent a counterfeit of the mark 20 shown in FIG. 1, or may represent a second unique instance of the mark for identification purposes. This second printed mark 30 is also a 2-dimensional barcode. This counterfeit barcode 30, when read with a 2-dimensional barcode reader, presents exactly the same decoded information as the mark 20 of FIG. 1. When the mark 30 of FIG. 3 is acquired, in an embodiment, significant features are identified and captured as "signature" data that uniquely identifies the mark. As in the case of FIG. 1, this signature data is derived from the physical and optical characteristics of the mark's geometry and appearance and can include data that is encoded in the mark (e.g., if the mark is a data-carrying symbol such as a 2-dimensional barcode). The properties of the mark evaluated for creating the signature data are usually the same properties used in evaluating the first instance of the mark, so that the two signatures are directly comparable.

Figure 4:
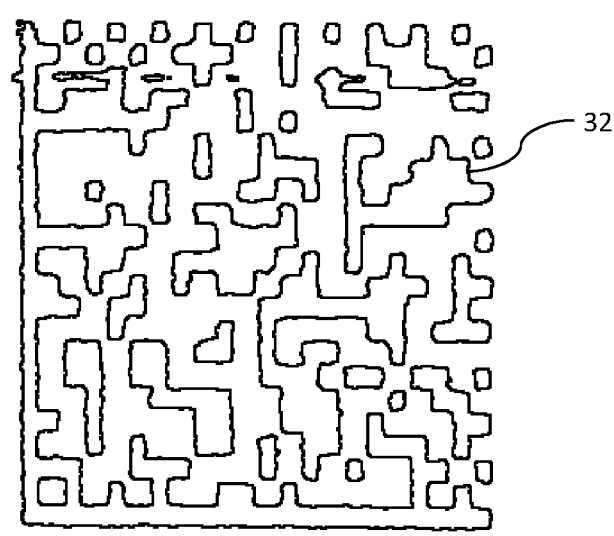
FIG. 4 is an illustration of the mark in FIG. 3 with the mark's edge features extracted for clarity.

FIG. 4 provides an enhanced view of some of the variations present in the mark 30 shown in FIG. 3. FIG. 4 shows only the edges 32 of the mark shown in FIG. 3, similarly to FIG. 2. The corresponding features and variations, such as edge linearity, region discontinuities, and feature shape within the mark shown in FIG. 3 are readily apparent. Examples of some of the features that may be used are shown in more detail in FIG. 5, which is discussed in more detail below.

Figure 6:
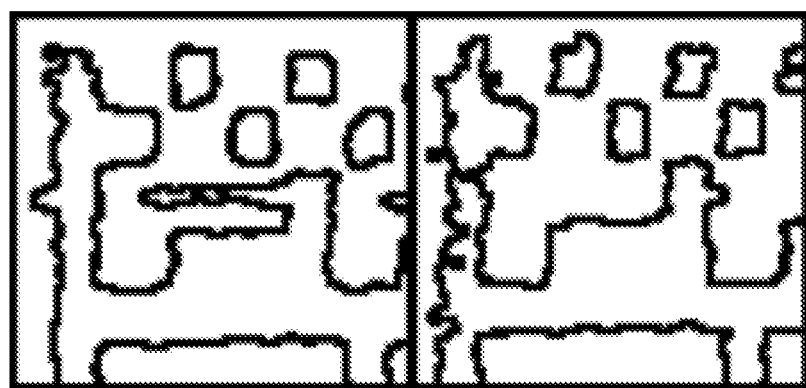
FIG. 6 is an illustration comparing the features of the upper left sections of FIG. 2 and FIG. 4.

FIG. 6 shows a close comparison of the upper left corner features of FIG. 2 and FIG. 4. As may be seen most clearly in FIG. 6, the two printed marks 20, 30 of FIGS. 1 and 3, even though identical in respect of their overtly coded data, contain numerous differences on a finer scale, resulting from the imperfections of the printing process used to apply the marks. These differences are durable, usually almost as durable as the mark itself, and are practically unique, especially when a large number of differences that can be found between the symbols of FIG. 1 and FIG. 3 are combined. Further, the differences are difficult, if not almost impossible, to counterfeit, because the original symbol would have to be imaged and reprinted at a resolution much higher than the original printing, while not introducing new distinguishable printing imperfections. While only the upper left corner section of the marks is shown here, differentiable features between the two marks shown in FIGS. 1 and 3 run throughout the entirety of the marks and can be utilized according to various embodiments.

Figure 7:
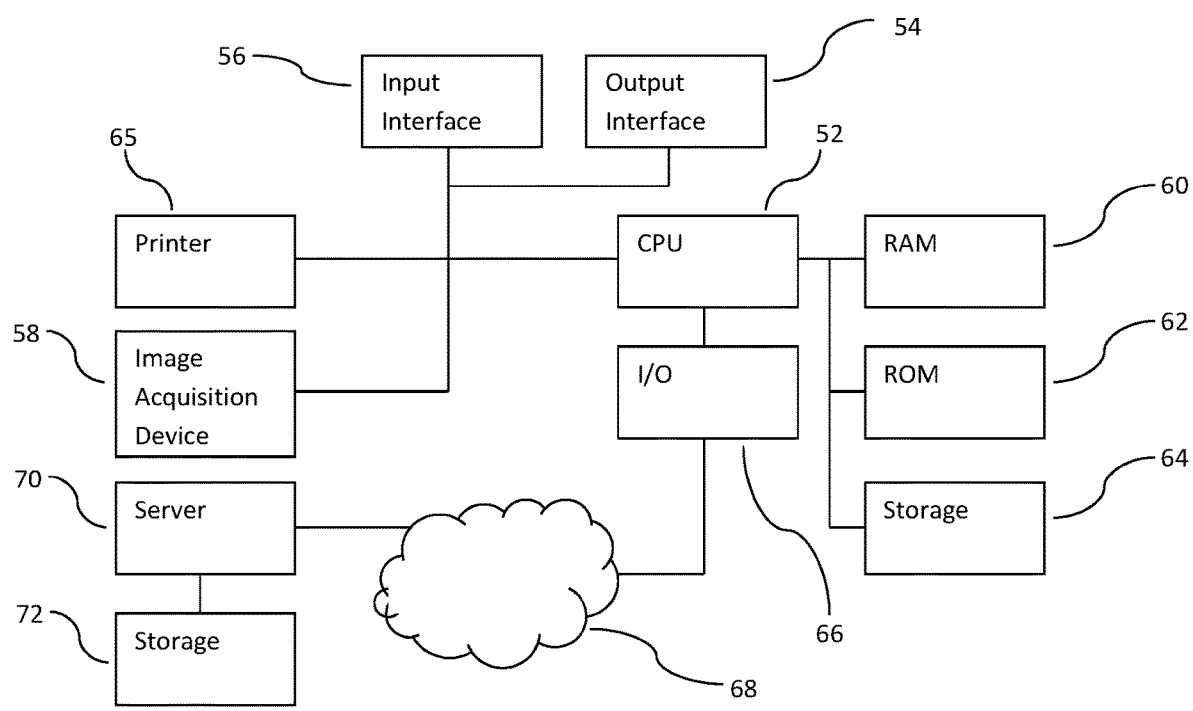
FIG. 7 is a schematic diagram of a computer system.

Referring to FIG. 7, an embodiment of a computing system 50 comprises, among other equipment, a processor or CPU 52, input and output devices 54, 56, including an image acquisition device 58, random access memory (RAM) 60, read-only memory (ROM) 62, and magnetic disks or other long-term storage for programs and data. The computing system 50 may have a printer 65 for generating marks 20, or the printer 65 may be a separate device. The computing system 50 may be connected through an interface 66 to an external network 68 or other communications media, and through the network 68 to a server 70 with a long-term storage 72. Although not shown in the interests of simplicity, several similar computer systems 20 may be connected to server 70 over network 68.

Figures 8, 10:
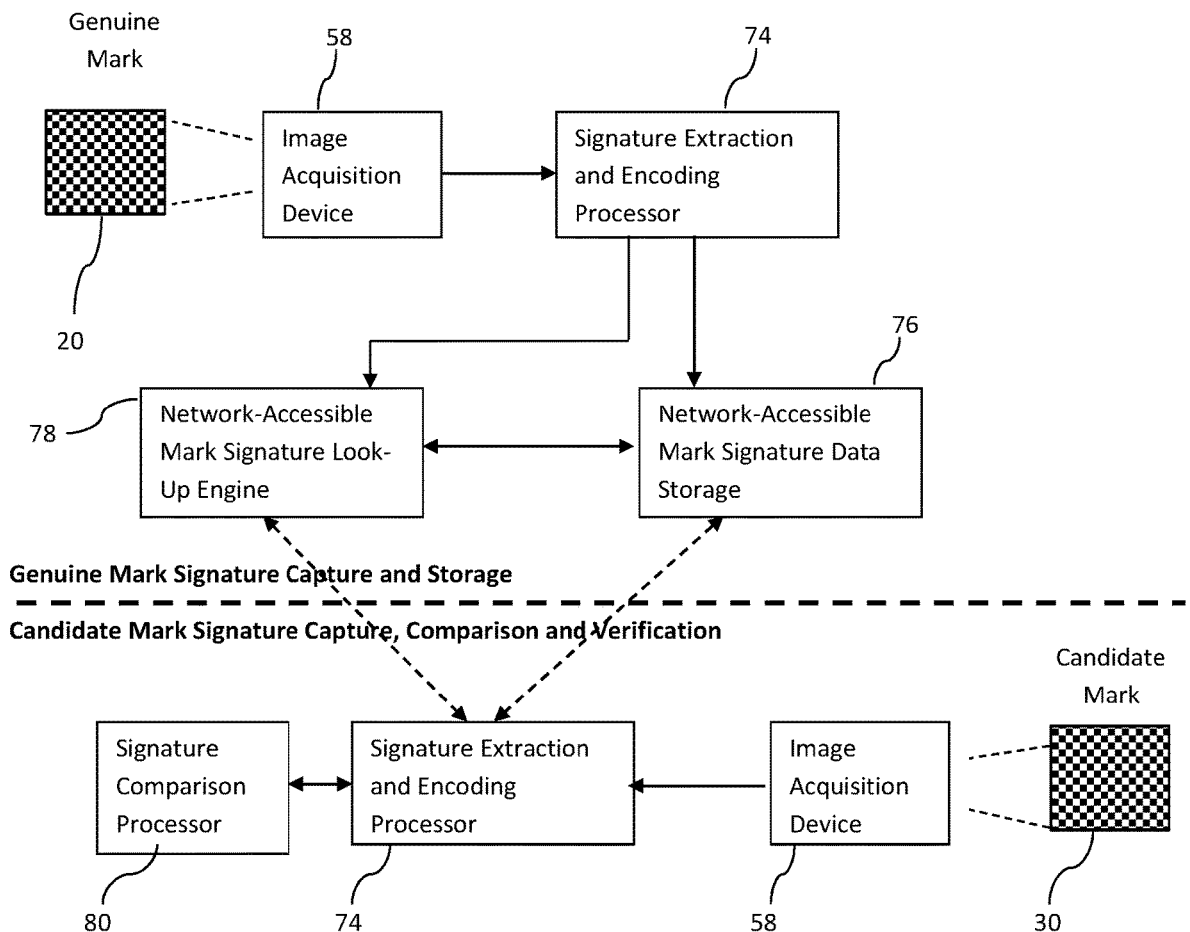
FIG. 8 is a block diagram of a computer system operative to carry out the process of embodiments of the disclosure.
FIG. 10 is a diagram of the weighting of characteristic features.

Referring to FIG. 8, in an embodiment, the image acquisition device 58 supplies image data to a signature extraction and encoding processor 74, which may be software running on the CPU 52 of computer system 50, or may be a dedicated co-processor. The signature extraction and encoding processor 74 supplies signature data to a network-accessible mark signature data storage 76, which may be the long-term storage 72 of the server 70. A network-accessible mark signature look-up engine 78, which may be software running on the CPU 52 of computer system 50, or may be a dedicated co-processor, receives signature data from the signature extraction and encoding processor 74 and/or the signature data storage 76. A signature comparison processor 80 usually compares a signature extracted by the signature extraction and encoding processor 74 from a recently scanned mark 30 with a signature previously stored in the signature data storage 76 and associated with a genuine mark 20. As shown symbolically by the separation between the upper part of FIG. 8, relating to genuine mark signature capture and storage, and the lower part of FIG. 8, relating to candidate mark signature capture, comparison, and verification, the computer system 50 that scans the candidate mark 30 may be different from the computer system 50 that scanned the original mark 20. If they are different, then they may share access to the signature data storage 76, or a copy of the stored signature data may be passed from the signature data storage 76 on the genuine mark capture system 50 to the candidate mark evaluation system 50.

Figure 9:
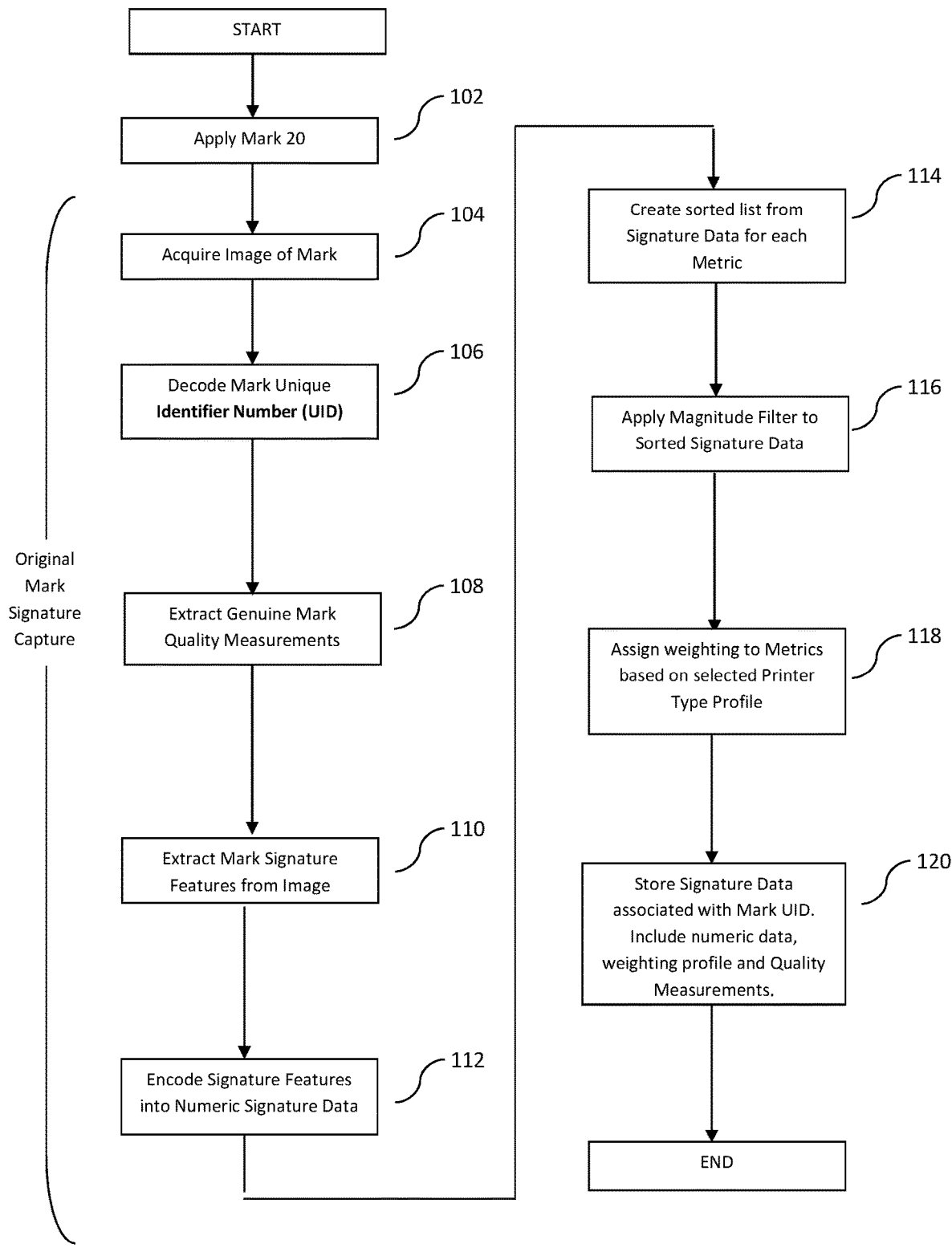
FIG. 9 is a flow chart of an embodiment of a method of recording a new mark.

In more detail, and referring to FIG. 9, in an embodiment, in step 102 a mark, which in this example is illustrated as a 2-D barcode similar to that shown in FIG. 1, is applied to an object, or to a label that is subsequently applied to an object, by a printer 65. As has already been explained, a printer applying a 2-D barcode typically introduces a significant number of artifacts that are too small to affect the readability of the overt data coded by the barcode, and are too small for their appearance to be controllable in the printing process, but are visible (possibly only under magnification) and durable. If a particular printer does not naturally produce a sufficient number of artifacts, some printers can be configured to include random or pseudorandom variations in their output, as is further discussed below.

In step 104, the mark is acquired by a suitable imaging or other data acquisition device, such as the image acquisition device 58. The imaging device that acquires the mark may be of any expedient form, including a conventional device or a device hereafter to be developed. In this embodiment, the imaging device gathers data on the appearance of the mark at a level of detail considerably finer than the controllable output of the device that applied the mark. In the example shown in FIGS. 1-4, the detail is the shape of the boundaries between light and dark areas at a resolution considerably finer than the size of the modules of the printed 2-D barcode. Other examples of suitable features are described below. If the mark is being used as an anti-counterfeiting measure, it is strongest if the imaging device gathers data at a level of detail finer than the controllable output of a device that is likely to be used to apply a counterfeit mark. However, that is not necessary if it is possible to keep secret the fact that particular details in a particular mark are being used for that purpose.

In step 106, a UID included in the overt data of mark 20 is decoded. If the printer 65 is on the same computer system 50 as the image acquisition device 58, the UID may be passed from one to the other, avoiding the need to decode the UID from the image acquired by image acquisition device 58. If the mark 20 does not include a UID, some other information uniquely identifying the specific instance of mark 20 may be used in this step.

In steps 110 and 112, the image of the mark 20 is analyzed by the signature extraction and encoding processor 74 to identify significant features. In step 120, data relating to those features will then be stored in the signature data storage 76 as "signature" data that uniquely identifies the mark 20. This signature data is derived from the physical and optical characteristics of the mark's geometry and appearance, and in addition, can include data that is encoded in the mark, should the mark be a data-carrying symbol such as a 2-dimensional barcode. The properties of the mark evaluated for creating the signature data can include, but are not limited to, feature shape, feature contrast, edge linearity, region discontinuities, extraneous marks, printing defects, color, pigmentation, contrast variations, feature aspect ratios, feature locations, and feature size.

Figure 5:
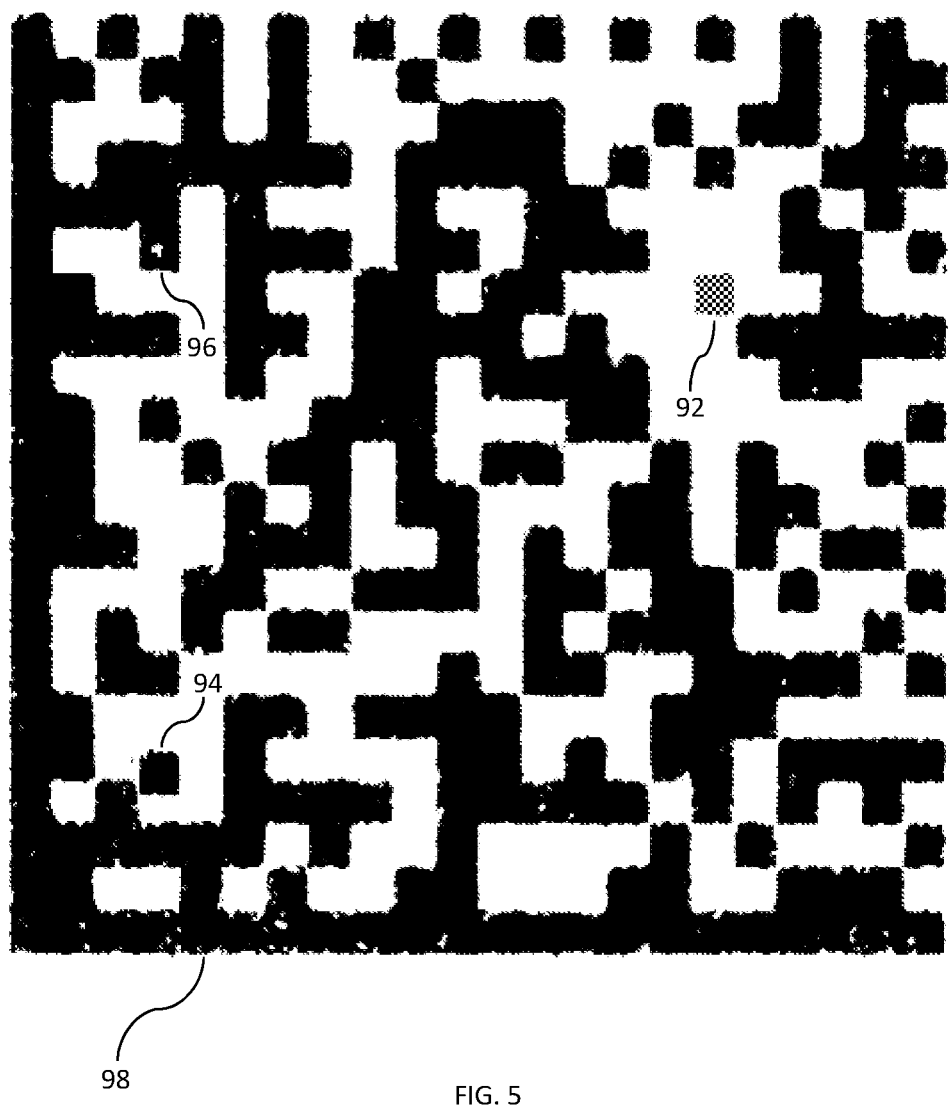
FIG. 5 is a 2-D data matrix illustrating some features that may be used in the present disclosure.

Referring now to FIG. 5, in the following example, deviation in an average module pigmentation or marking intensity 92, a module position bias 94 relative to a best-fit grid, the presence or location of extraneous marks or voids 96 in the symbol, and the shape (linearity) of long continuous edges 98 in the symbol are used as exemplary variable features. These act as the primary metrics forming the unique symbol signature. Illustrations of some of these features are shown in FIG. 5.

In the case of the mark being a data-carrying symbol, such as a 2-dimensional barcode, the present embodiment can take advantage of the additional information embodied by and encoded into the symbol. The information that is encoded, for example a unique or non-unique serial number, itself may then be included as part of the signature data or used to index the signature data for easier retrieval.

Further, in the case of a 2-dimensional barcode or other data carrier for which a quality measure can be established, in step 108 information representing the quality of the symbol can optionally be extracted and included as part of the signature data.

The quality information can be used to detect changes to the mark 20 that might cause a false determination of the mark as counterfeit, as these changes can alter the signature data of the mark. Some of the quality measurements that can be used are, but are not limited to, Unused Error Correction and Fixed Pattern Damage as defined in ISO spec 15415 "Data Matrix Grading processes" or other comparable standard. These measures make it possible to detect areas that would contribute signature data that has been altered by damage to the mark and thus discount it from consideration when comparing a mark's signature data against the stored signature data of the genuine mark.

Signature Metrics Weighting

In this example, the ease with which each of the four metrics illustrated in FIG. 5 can be extracted depends on the imaging resolution, and the metrics can be arranged in order of the resolution required to extract useful data relating to each of the four metrics, as shown in FIG. 10. In order from lowest to highest resolution, those are: module pigmentation, module position bias, void/mark location, and edge shape projection.

Increasing image fidelity and resolution allows for increasingly precise analysis, making use of the progressively higher precision analytics. For example, in a low resolution image, perhaps only module average pigmentation 92 and module position bias 94 can be extracted with significant confidence, so those results are given more weight in determining the signature match of a candidate symbol against stored genuine data. With a high resolution image, processing can continue all the way up to the fine edge projection metric 98 and use that as the highest weight consideration in signature match determination. If there are disagreements with the expected signature among other (lower weight) measures, these may be due to symbol damage or artifacts of the image capture device. However, damage, alteration of the symbol 20, or imager artifacts are generally not likely to modify a counterfeit code 30 to coincidentally match with high precision the edge projection signature metric 98 of the valid item 20. Therefore, the edge projection, if highly correlated and exhibiting adequate magnitude in dynamic range, can supersede the lower-resolution metrics in support of a high match confidence.

Further, in an embodiment, the use of Error Correction information as provided by the standard decoding algorithms of that symbology (such that used in 2-D Data Matrix codes) is used to further weight signature metric data appropriately. If a data region within the symbol is corrupted by damage to the mark and that region yields a disagreement with stored signature data while other uncorrupt regions agree well, the voting weight of the corrupted region may be diminished. This mechanism prevents detectable symbol corruptions from presenting a false-negative result in a candidate symbol metric comparison against the genuine symbol signature data. The ISO 16022 "Data Matrix Symbol" specification describes an example of how Error Correction Codes (ECC's) can be distributed within a 2-D Data Matrix, and how corrupted and uncorrupted regions within a Data Matrix can be identified.

Magnitude Filtering

In steps 114 and 116, candidate signature features are evaluated to ensure they possess adequate magnitude to act as a part of each signature metric. This step ensures that the features forming each signature metric possess a real "signal" to encode as a distinguishing characteristic of the mark. Failure to apply threshold minima to signature contributor candidates can allow a signature that is easily subsumed by noise in any subsequent attempts to validate a mark against the genuine stored signature, rendering the validation process highly susceptible to the quality and fidelity limitations of the device(s) used to capture the mark data for signature analysis. By ensuring that signature metrics are formed solely of features satisfying these magnitude minima, the ability to perform successful verification of mark signatures with a wide variety of acquisition devices (camera-equipped cell phones, machine-vision cameras, low-quality or low-resolution imagers, etc.) and in a wide range of ambient environments (varied, low or non-uniform lighting, etc.) can be ensured or greatly facilitated.

In an embodiment, using a 2-D Data Matrix code as an example, in steps 110, 112, and 114 candidate features for the four signature metrics 92, 94, 96, 98 are extracted and sorted by magnitude. As previously described, the mark 20 is acquired such that the features can be processed in electronic form, typically as a color or gray-scale image. As a preliminary step, the 2-D Data Matrix is first analyzed as a whole and a "best fit" grid defining the "ideal" positions of the boundaries between cells of the matrix is determined. Candidate features are then selected by finding features that are most deviant from the "normal" or "optimum" state of the marks attribute(s) for the particular metric being analyzed. Considering the 2-D Data Matrix code example shown in FIG. 5, some suitable attributes are:

1. The modules 92 whose average color, pigmentation or mark intensity are closest to the global average threshold differentiating dark modules from light modules as determined by the Data Matrix reading algorithms (i.e., the "lightest" dark modules and the "darkest" light modules).

2. The modules 94 that are marked in a position that is most deviant from the idealized location as defined by a best-fit grid applied to the overall symbol 20. Two possible methods of identifying these modules are: (a) extract the candidate mark module edge positions and compare those edge positions to their expected positions as defined by an idealized, best-fit grid for the whole symbol 20; (b) extract a histogram of the boundary region between two adjacent modules of opposite polarity (light/dark or dark/light), with the sample region overlapping the same percentage of each module relative to the best-fit grid, and evaluate the deviation of the histogram from a 50/50 bimodal distribution.

3. The extraneous marks or voids 96 in the symbol modules 94, whether they are light or dark, are defined as modules possessing a wide range of luminance or pigment density. In other words, they are defined as modules possessing pigmentation levels on both sides of the global average threshold differentiating dark modules from light modules, with the best signature candidates being those with bimodal luminance histograms having the greatest distance between the outermost dominant modes.

4. The shape of the long continuous edges 98 in the symbol, such as their continuity/linearity or degree of discontinuity/non-linearity. One method of measuring this attribute and extracting this data is by carrying out a pixel-wide luminance value projection, with a projection length of one module, offset from the best fit grid by one-half module, run perpendicular to the grid line bounding that edge in the best-fit grid for the symbol.

The 2-D Data Matrix makes a good example because it includes square black and white cells, in which the above described features are easily seen. However, the same principles can of course be applied to other forms of data-encoding or non-data-encoding visible mark.

Once candidate features complying with the above-described criteria have been identified, the candidate features are sorted in step 114 into a list in order of magnitude, and are then subjected in step 116 to magnitude limit filtering by finding the first feature in each list that does not satisfy the established minimum magnitude to qualify as a contributor to that metric. The threshold may be set at any convenient level low enough to include a reasonable number of features that cannot easily be reproduced, and high enough to exclude features that are not reasonably durable, or are near the noise-floor of the image acquisition device 58. In this embodiment, the low-magnitude end of the sorted list is then truncated from that point and the remaining (highest magnitude) features are stored, along with their locations in the mark, as the signature data for that metric. Preferably, all features above the truncation threshold are stored, and that implicitly includes in the signature the information that there are no signature features above the magnitude filter threshold elsewhere in the mark.

As it is known beforehand that different marking device technologies present superior or inferior signature features in different attributes for use in creating Metrics signature data, the marking device type may be used to pre-weight the metrics in what is referred to as a Weighting Profile. For example, should the genuine marks be created using a thermal transfer printer, it is known that edge projections parallel to the substrate material direction of motion are unlikely to carry a signature magnitude sufficient to encode as part of the genuine signature data. This knowledge of various marking device behaviors may be used during the capture of the original genuine signature data. If employed, all metrics used in the creation of the genuine mark signature are weighted as appropriate for the known behaviors of that particular marking device type, and the resulting emphasis/de-emphasis mapping of the metrics becomes a Metrics Weighting Profile. In step 118, this profile of the metrics weighting, based on the marking device type used to create the original mark, is stored as part of the signature data.

In step 120, the signature metrics are stored as sorted lists of features, in descending order of magnitude. The list entry for each feature includes information localizing the position in the mark from which that feature was extracted.

In this embodiment, the record for each symbol is indexed under a unique identifier content (typically a serial number) included in the explicitly encoded data in the symbol. The record may be stored on a network accessible data storage server or device, or may be stored locally where it will be needed. Copies may be distributed to local storage at multiple locations.

Low Amplitude Signature Metrics

In an embodiment, if the instance of a symbol 20 or an identifiable region within the symbol 20 lacks any signature feature satisfying the minimum magnitude for one or more of the signature metrics, that fact itself is stored as part of the signature data, thereby utilizing the lack of significant feature variation as part of the unique identifying information for that symbol. In this case, a symbol subjected to verification against that data is considered genuine only if it also possesses zero signature features satisfying the minimum magnitude for the metric(s) in question, or at least sufficiently few significant features to pass a statistical test. In these cases, the weighting for that particular metric is diminished, as a region with no distinguishing characteristics is a less robust identifying feature than would be a region with significant distinguishing characteristics. A symbol or region with no significant signature feature is most useful negatively. The absence of significant features from both the genuine mark 20 and the candidate mark 30 is only weak evidence that the candidate mark is genuine. The presence of a significant feature in a candidate mark 30, where the genuine mark 20 has no feature, is stronger evidence that the candidate mark is counterfeit.

An exception is made for features of appreciable signature magnitude that can be attributed to symbol damage in the candidate symbol 30, revealed via the aforementioned use of symbol Error Correction information from the decoding algorithms of that particular symbology, and subject to the principles of captured image fidelity signature metrics weighting as previously described.

In the extreme case where both the genuine mark 20 and the candidate mark 30 contain ONLY sub-threshold data (as in 2 "perfect" symbols), they would be indistinguishable by the process of the present example because that process relies on some measurable variation in either the genuine or counterfeit mark to act as a way of detection. That is not a problem in practice, as none of the usage scenarios presently contemplated (typically, on-line, high speed printing) produce perfect symbols.

If necessary, for example, if the printing process used is too well controlled to produce a sufficiency of measurable variations, then in step 102 marks 20 can be created with deliberately introduced random or quasi-random variations. Such variations can then be detected in conjunction with detecting the variations arising naturally from the mark creation process in the manner described previously. For example, if the marks are printed on labels, a printer and label substrate may be used that produce marks of such high quality that the naturally arising variations are insufficient to reliably distinguish individual marks from each other. In that case, the printing process may be modified to introduce random or quasi-random anomalies to the printed marks, so that the randomly introduced anomalies and the naturally arising variations together are sufficient to reliably distinguish individual marks from each other.

In contrast to methods that rely solely on deliberately applied security features, the present process needs only to add a minimum of quasi-random features to fortify the naturally occurring variation. In this way, it is possible to create the conditions where the mark can then satisfy enough of the magnitude filter threshold minima for creating a usable signature. Such artifacts may be introduced into the mark 20 using any appropriate method. For example, in exemplary embodiments, the printer may be adapted to self-create the necessary artifacts as part of the printing process, or the software that generates the marks before printing may be modified to introduce artifacts, or the like.

Thus, deliberately introduced artifacts can boost the performance of the herein described systems and methods when using low-variation marking technologies.

Analysis

Figure 11:
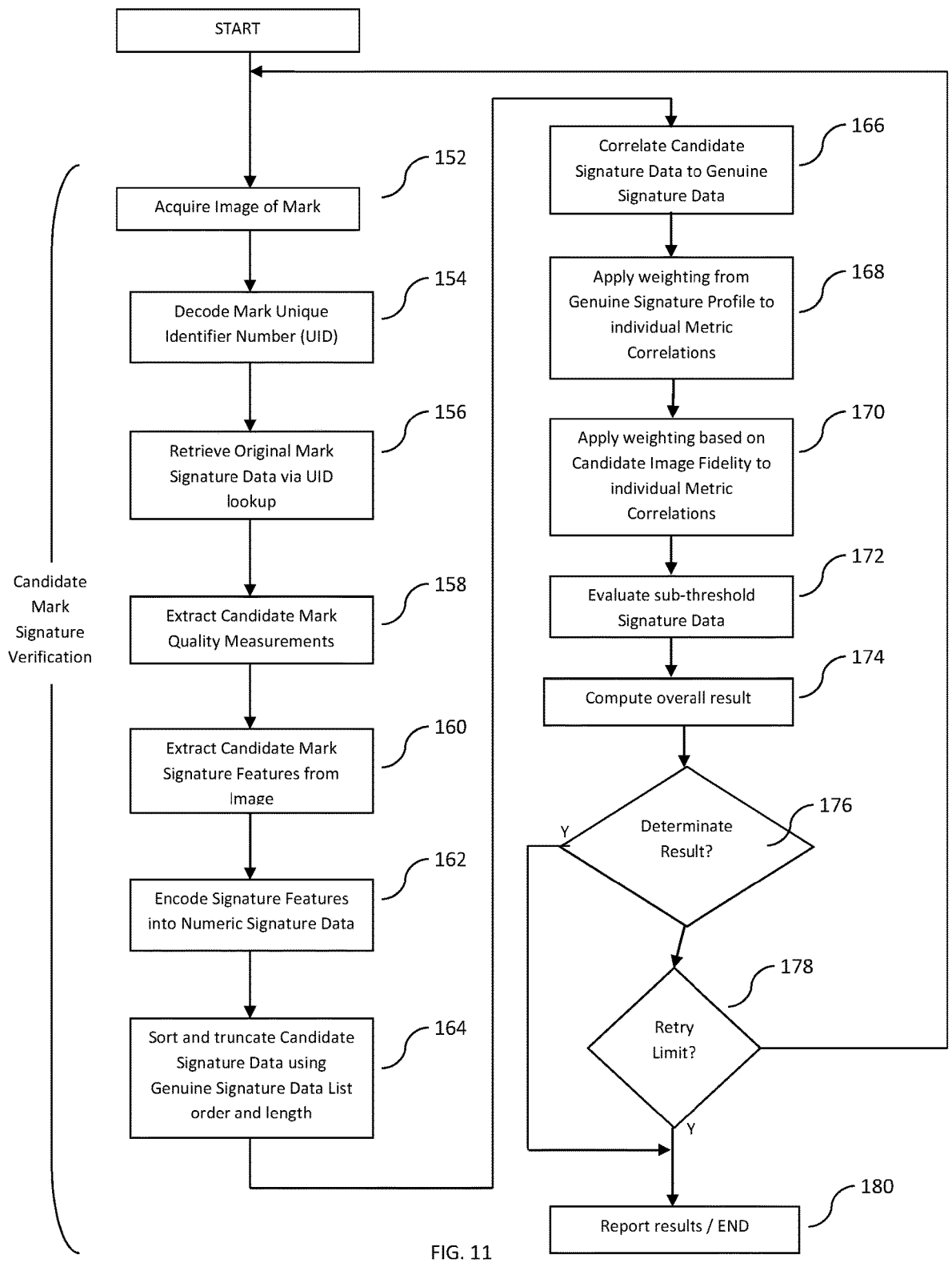
FIG. 11 is a flow chart of an embodiment of a method of evaluating a mark.

Referring to FIG. 11, in the present embodiment, signature metrics are stored as a sorted list, in descending order of magnitude, and include information localizing their position in the mark from which they were extracted. In the preferred embodiment, using a 2-D Data Matrix code as an example, the process by which a candidate mark or symbol is evaluated to determine if it is genuine is as follows:

In step 152, an image of the candidate mark 30 is acquired by the image acquisition device 58.

In step 154, the explicit data in candidate mark 30 is decoded and its UID content is extracted.

In step 156, the UID is used to look up the signature metric data originally stored for the original symbol 20 having that UID. The stored data may be retrieved from the local storage 64 or may be retrieved from a network accessible data storage server or long-term storage 72. In the case of a candidate mark 30 that does not contain a UID, some other identifying information may be obtained relating to the candidate mark 30. Alternatively, the entire database of genuine mark signatures on local storage 64 or long-term storage 72 may be searched after step 164 below, to attempt to locate a genuine signature that matches candidate mark signature.

In step 158, in the case of a 2-dimensional barcode or other data carrier for which a quality measure can be established, quality measurements 158 for the candidate mark 30 may be obtained, similarly to those obtained in step 108 for the genuine mark 20. The quality measurements may be used in the subsequent analysis steps to reduce the weight given to a mark, or parts of a mark, that appear to have been damaged since it was applied. Also, if the quality measurements of the original symbol 20 were stored as part of the genuine signature data, the stored quality measurements can be verified against the signature data extracted from the candidate mark 30.

In step 160, significant signature features are extracted from the image of candidate mark 30 that was acquired in step 152. The whole of candidate mark 30 (other than sections that have been disqualified as corrupt because of ECC errors) is searched for significant features. In addition, the information specifying the locations within the symbol from which the original, genuine symbol signature data was extracted is used to specify from where to extract the signature data from the candidate symbol. That ensures that a feature present in mark 20 but absent from mark 30 is noted.

In step 162, the signature features are encoded for analysis.

In step 164, the signature data extracted from the candidate symbol 30 is sorted into the same order (for example, magnitude-sorted) as the original list of the original symbol 20.

In steps 166, the candidate signature data is compared to the stored original signature data. The data is subjected to a statistical operation revealing numeric correlation between the two data sets. Each metric is subjected to individual numerical analysis yielding a measure reflecting the individual confidence of the candidate symbol as being the genuine item for that metric. If the mark does not contain UID data, and no alternative identifying data is available, it may be necessary to search through a database of similar marks, using the procedures discussed with reference to FIG. 13 below. For example, in the case of FIGS. 1 and 3, it may be necessary to search through all genuine marks 20 that have the same overt pattern of black and white modules. The objective of the search is to identify, or fail to identify, a single genuine mark 20 that is uniquely similar to the candidate mark 30.

In step 168, where the Metrics Weighting Profile was stored as part of the genuine signature data, this information is used to emphasize and/or de-emphasize metrics as appropriate for the type of marking device used to create the original genuine marks.

In step 170, where the image acquisition devices 58 used in steps 104 and 152 have different sensitivities, the contributions of signature data to the overall analysis result may need to be adjusted. For example, the minimum magnitude threshold used for significant features may need to be set at a level appropriate for the less sensitive image acquisition device 58, or a particular metric may need to be omitted from the analysis set as it is known not to carry adequate signature magnitude in marks produced by the original marking device. In some cases, a feature that is recognized in one of the higher resolution categories in the scale shown in FIG. 10 may be mistaken by a lower-resolution scanner for a feature in a different category. For example, a feature that is seen at high resolution as a black module with a white void may be seen at low resolution as a "low pigmentation module." In general, the resolution of the verification scanner 58 is used in conjunction with the marking device Metrics Weighting Profile to determine what metrics to emphasize/de-emphasize. In this example, in the low resolution image the feature could exist in the "low pigment" list, but would exist in both the "low pigment" and "void" lists in the high resolution image. Since the methods used are ultimately subjected to statistics-based analytics, the occasional occurrence of a minor mark that fell below the resolution of the original scan will be of negligible impact. This is because, even though such a mark is not resolved as an "object," its effect will be captured in at least one of the metrics employed (such as reduced module gray level as in this example). That has proven true in practical trials even when using scan resolutions up to 2× higher in the verification image as was used in the original signature scan.

If it is desired to correct explicitly for the resolution of the original and/or verification scan, in many cases the resolution can be determined at verification time by detecting a comparatively abrupt drop in the number of artifacts at the scanner's resolution threshold. Alternatively, where the original scanner may be of lower resolution than the verification scanner, the resolution of the scan, or other information from which the resolution can be derived, may be included as metadata with the stored signature, similarly to the Metrics Weighting Profile discussed above. Whatever procedure is used, sorting the signature data in order by magnitude of the artifact makes it very easy to apply or change a threshold magnitude.

In step 172, by exclusion, all locations within a mark not represented in the sorted list of feature locations satisfying the minimum magnitude threshold are expected to be devoid of significant signature features when analyzing a genuine mark. This condition is evaluated by examining the signature feature magnitude at all locations within a candidate mark where sub-threshold features are expected and adjusting the results for the appropriate metric toward the negative when features exceeding the threshold minimum are found. If the significant features are found in a region determined to have been damaged when evaluated for symbol error correction or other quality attributes, the adjustment is diminished or not carried out at all depending on the location of the damage relative to the feature extraction point and the nature of the particular metric involved. For example, if a discrepancy in a signature feature relative to the original mark 20 is extracted from a module of the candidate mark 30 that is near, but not the same as, the damaged module(s), the negative adjustment to the metric because of that feature may be diminished by a proportion that reflects reduced confidence in the metric signature. This is because the former module, being near a known damaged region, may well have suffered damage that affects the metric but falls below the detectable threshold of the quality or ECC evaluation mechanism of the symbology. If the discrepancy is extracted directly from a damaged module, or if the metric is one of the types that spans multiple modules and that span includes the damaged one, the adjustment will not be applied at all.

In step 174, these individual confidence values are then used to determine an overall confidence in the candidate symbol 30 as genuine (or counterfeit), with the individual confidence values being weighted appropriately as described above using image fidelity, resolution and symbol damage information.

In step 176, it is determined whether the result is sufficiently definite to be acceptable. If the comparison of the signature data yields an indeterminate result (for example, the individual metrics having contradictory indications not resolvable through the use of the data weighting mechanism), the user submitting the symbol for verification is prompted to re-submit another image of the symbol for processing, and the process returns to step 152.

For practical reasons, the number of permitted retries is limited. In step 178, it is determined whether the retry limit has been exceeded. If so, a further return for rescanning is prevented.

Once the analysis has been completed successfully, the results of the comparison analysis are reported in step 180. The report may be pass/fail, or may indicate the level of confidence in the result. These results may be displayed locally or transferred to a networked computer system or other device for further action. If the result is still indeterminate when the retry limit is reached, that also proceeds to step 178, where the indeterminate result may be reported as such.

Upon the storing of the signature data extracted from the mark 20 shown in FIG. 1, the present embodiment is capable of recognizing that same mark as genuine when presented as a candidate mark 30 by virtue of the fact that, when analyzed by the same process, the candidate mark 30 is determined to possess the same signature data (at least to a desired level of statistical confidence). Similarly, the present embodiment is capable of identifying a counterfeit copy 30 of the mark 20 shown in FIG. 1 or distinguishing a different unique instance 30 of the mark by recognizing that the signature data (e.g., as extracted from the instance of the mark in FIG. 3) does not match the signature data originally stored from when the genuine mark shown in FIG. 1 was originally processed.

Operation on Distorted Substrates

In developing the signature metrics in an embodiment, immunity to distortions of the substrate upon which the analyzed marks are made may be important. Module luminance or color, module grid position bias, void or mark locations and edge profile shape are properties where the extraction methods employed can be made largely immune to signature data impacts caused by presentation on distorted substrates. This is accomplished by using feature extraction methods that dynamically scale to the presented mark geometry independent of changes in mark aspect ratio. The primary mechanism for this in an embodiment is the creation of the best-fit grid for the candidate mark at the start of extraction. This is especially important in the case where the genuine mark 20 is made on a label travelling on a flat label web and the label is then applied to an object that is not flat, such as a bottle with a curved surface. The candidate marks 30 submitted for analysis to check their status as genuine or counterfeit may be acquired for processing while on the non-flat surface (e.g., a round bottle). The ability to verify symbols presented on various substrate geometries with minimum impact on the reported signature metrics represents a significant advantage to the methods described herein.

Local Reference Measurements for Metric Data for Environmental Immunity

To further make the extraction of accurate signature data robust in an embodiment, various methods described herein may utilize area-local referencing within the analyzed symbol for composing the signature data. This provides greater immunity to things like the aforementioned substrate distortion, non-uniform lighting of the candidate symbol when acquired for processing, non-ideal or low quality optics in the acquiring device, or many other environmental or systematic variables. In an embodiment, the metric reference localizations are:

1. Average module color, pigmentation or mark intensity reference the nearest neighbor(s) of the opposite module state (dark vs. light or light vs. dark). Where a cell is identified as a significant feature 92 with deviant average pigmentation density, the cells for which it was a nearest neighbor may need to be reassessed discounting the identified deviant cell as a reference.

2. Module grid position bias is referenced to the overall symbol best fit grid, and as such has native adaptive reference localization.

3. The analysis of extraneous marks or voids in the symbol modules uses module-local color, pigmentation or mark intensity references. In other words, the image luminance histogram within the analyzed module itself provides reference values for the applied methods.

4. The projection methods used to extract the shapes of long continuous edges in the symbol are differential in nature and have native immunity to typical impacting variables.

Figure 12:
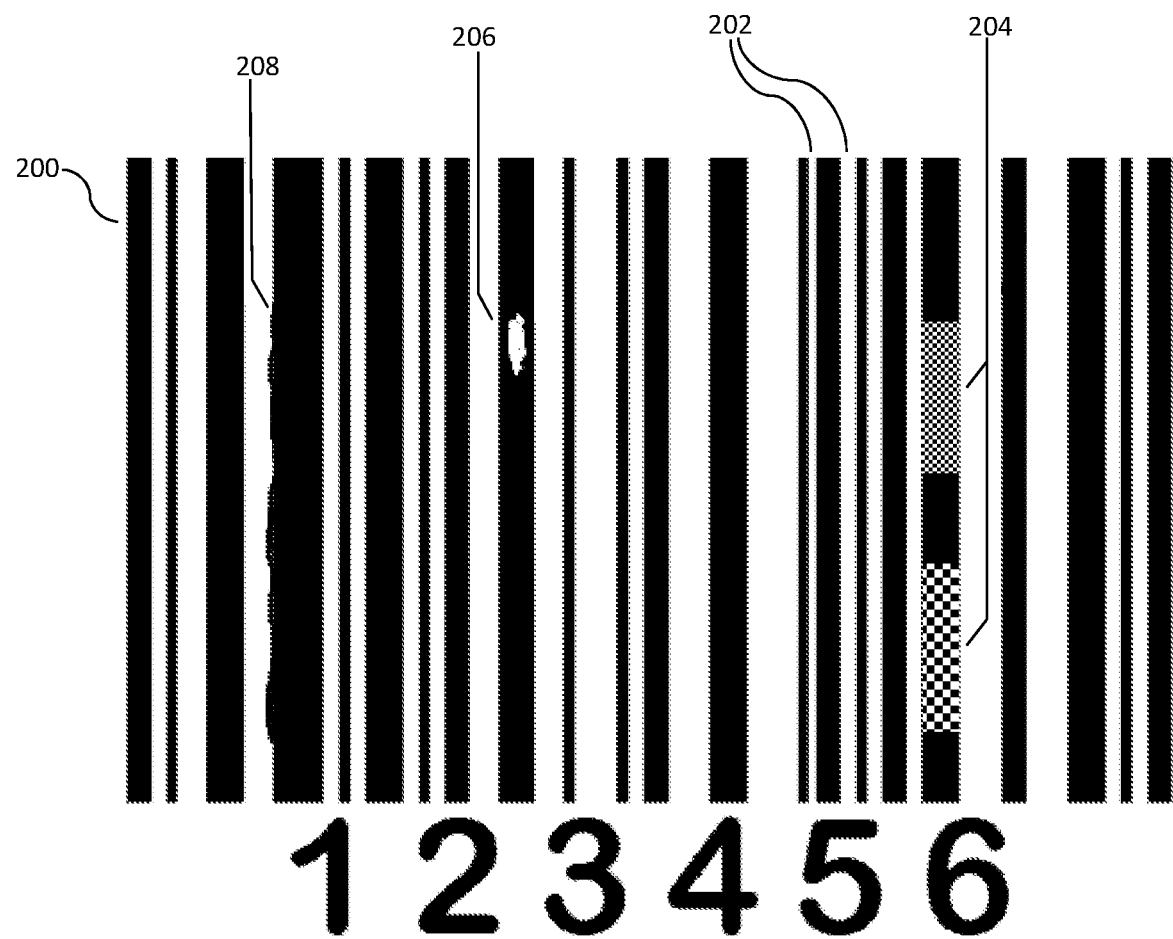
FIG. 12 is a 1-D barcode illustrating some features that may be used in the present disclosure.

FIG. 12 depicts an alternative embodiment that is similar to the process described with reference to FIG. 5, but that may use types of mark other than the 2-D symbol. For instance, the symbol may be a 1-D linear barcode, a company logo, etc. FIG. 12 shows some features of a 1-D linear barcode 200 that may be used as signature metrics. These include: variations in the width of and/or spacing between bars 202; variations in the average color, pigmentation or intensity 204; voids in black bars 206 (or black spots in white stripes); or irregularities in the shape of the edges of the bars 208.

Analysis by the Autocorrelation Method

In the embodiments described above, the raw list of data for each metric may first be array-index matched and subjected to normalized correlation to a like-order extracted metric set from a candidate symbol. These correlation results are then used to arrive at a match/no match decision (genuine vs. counterfeit). To do that, storage of the signature includes the sorting order of the original genuine symbol modules as well as the trained metrics values themselves, complete for each metric. In addition to the exhaustive storage need, the raw data is not "normalized," because each metric has its own scale, sometimes unbounded, which complicates the selection of storage bit-depths. A typical implementation of the above-described embodiments has a stored signature size of approximately 2 kilobytes.

Referring now to FIGS. 13 to 17, an alternative embodiment of metrics post-processing, storage and comparison methods is applied after the original artifact metrics have been extracted and made available as an index-array associated list (associable by module position in the symbol). Based on autocorrelation, the application of this new post-processing method can, in at least some circumstances, yield several significant benefits when compared to the signatures of the previous embodiments. Most significant is a reduction in data package size. For example, a 75% reduction in the stored signature data has been realized. Even more (up to 90% reduction) is possible with the application of some minor additional data compression methods. This dramatic reduction arises from the use of autocorrelation, list sorting, and the resultant normalization and data-modeling opportunities these mechanisms allow to be applied to the original artifacts' data.

Where in the embodiments described above the analysis of a particular set of metrics data takes the form of comparing the sorted raw metrics extracted from a candidate symbol to the like-ordered raw metrics extracted from the genuine symbol, the autocorrelation method compares the autocorrelation series of the sorted candidate symbol metrics data to the autocorrelation series of the (stored) sorted genuine symbol data—effectively we now correlate the autocorrelations. In an embodiment, the Normalized Correlation Equation is used:

$$r_{xy} = \frac{n\sum x_i y_i - \sum x_i \sum y_i}{\sqrt{n\sum x_i^2 - (\sum x_i)^2} \sqrt{n\sum y_i^2 - (\sum y_i)^2}}$$

where r is the correlation result, n is the length of the metric data list, and x and y are the Genuine and Candidate metrics data sets. When the operation is implemented as an autocorrelation, both data sets x and y are the same.

To produce the autocorrelation series, the correlation is performed multiple times, each time offsetting the series x by one additional index position relative to the series y (remembering that y is a copy of x). As the offset progresses the data set must "wrap" back to the beginning as the last index in the y data series is exceeded due to the x index offset; this is often accomplished most practically by doubling the y data and "sliding" the x data from offset 0 through offset n to generate the autocorrelation series.

In implementing the autocorrelation approach, the first benefit observed is that it is not necessary to store the signature data values themselves as part of the stored data. In autocorrelation, a data series is simply correlated against itself. So, where previously it was necessary to deliver both the extraction (sort) order and genuine signature data values to the verification device for validation, now only the sort/extraction order for the autocorrelation series operation need be provided.

The genuine autocorrelation signature needed to compare to the candidate symbol results does not require storing or passing the genuine data to the verifier. Because the operation of generating the signature is always performed on sorted metrics data, the autocorrelation series for the original artifacts' information is always a simple polynomial curve. Therefore, rather than needing to store the entire autocorrelation series of each genuine symbol metric, it is sufficient to store a set of polynomial coefficients that describe (to a predetermined order and precision) a best-fit curve matching the shape of the genuine autocorrelation results for each metric.

In an embodiment, $r_{xy}$ is computed, where each term $x_i$ is an artifact represented by its magnitude and location, and each term $y_i = x_{(i+j)}$, where j is the offset of the two datasets, for j=0 to (n−1). Because the $x_i$ are sorted by magnitude, and the magnitude is the most significant digits of $x_i$, there is a very strong correlation at or near j=0, falling off rapidly towards j=n/2. Because y is a copy of x, j and n−j are interchangeable. Therefore, the autocorrelation series always forms the U-shaped curve shown in FIG. 13, which is necessarily symmetric about j=0 and j=n/2. It is therefore only necessary to compute half of the curve, although in FIG. 13 the whole curve from j=0 to j=n is shown for clarity.

In practice, it has been found that a 6th order equation using 6 byte floating point values for the coefficients always matches the genuine data to within 1% curve fit error or "recognition fidelity." That is to say, if a candidate validation is done using the actual autocorrelation numbers and then the validation is done again on the same mark using the polynomial-modeled curve, the match scores obtained will be within 1% of each other. That is true both of the high match score for a genuine candidate mark and of the low match score for a counterfeit candidate mark. That allows a complete autocorrelation series to be represented with only 7 numbers. Assuming that 100 data points are obtained for each metric, and that there are 6 metrics (which have been found to be reasonable practical numbers), that yields a reduction of 600 data values to only 42, with no loss of symbol differentiability or analysis fidelity. Even if the individual numbers are larger, for example, if the 600 raw numbers are 4 byte integers and the 42 polynomial coefficients are 6 byte floating point numbers, there is a nearly 90% data reduction. In one experimental prototype, 600 single byte values became 42 4-byte floats, reducing 600 bytes to 168 bytes, a 72% reduction.

Further, the stored signature data is now explicitly bounded and normalized. The polynomial coefficients are expressed to a fixed precision, the autocorrelation data itself is by definition always between −1 and +1, and the sort order list is simply the module array index location within the analyzed symbol. For a 2-D data matrix, the module array index is a raster-ordered index of module position within a symbol, ordered from the conventional origin datum for that symbology, and thus has a maximum size defined by the definition of the matrix symbology. In one common type of 2-D data matrix, the origin is the point where two solid bars bounding the left and bottom sides of the grid meet. There is also established a standard sorted list length of 100 data points for each metric, giving a predictable, stable and compact signature.

In an embodiment, the comparison of a genuine signature to a candidate now begins with "reconstituting" the genuine symbol autocorrelation signature by using the stored polynomial coefficients. Then, the raw metrics data is extracted from the candidate symbol, and is sorted in the same sort order, which may be indicated as part of the genuine signature data if it is not predetermined.

The candidate metrics data is then autocorrelated. The resultant autocorrelation series may then be correlated against the reconstituted genuine autocorrelation curve for that metric, or alternatively the two curves may be compared by computing a curve-fit error between the pair. This correlation is illustrated graphically in FIGS. 13 and 16. This final correlation score then becomes the individual "match"

score for that particular metric. Once completed for all metrics, the "match" scores are used to make the genuine/counterfeit decision for the candidate symbol.

Additionally, use can further be made of the autocorrelation curves by applying power-series analysis to the data via discrete Fourier transform (DFT):

$$X_k = \sum_{n=0}^{N-1} x_n \cdot e^{-i2\pi kn/N}$$

where $X_k$ is the $k^{th}$ frequency component, N is the length of the metric data list, and x is the metrics data set.

The Power Series of the DFT data is then calculated. Each frequency component, represented by a complex number in the DFT series, is then analyzed for magnitude, with the phase component discarded. The resulting data describes the distribution of the metric data spectral energy, from low to high frequency, and it becomes the basis for further analysis. Examples of these power series are shown graphically in FIGS. 14, 15, and 17.

Two frequency-domain analytics are employed: Kurtosis and a measure of energy distribution around the center band frequency of the total spectrum, referred to as Distribution Bias. Kurtosis is a common statistical operation used for measuring the "peakedness" of a distribution, useful here for signaling the presence of tightly grouped frequencies with limited band spread in the power series data. In an embodiment, a modified Kurtosis function may be employed as follows:

$$\text{kurtosis} = \frac{\sum_{n=1}^{N}(Y_n - \overline{Y})^4}{N(N-1)s^4}$$

where $\overline{Y}$ is the mean of the power series magnitude data, s is the standard deviation of the magnitudes, and N is the number of analyzed discrete spectral frequencies.

The Distribution Bias is calculated as $$DB = \frac{\sum_{n=0}^{(N/2)-1} x_n - \sum_{n=N/2}^{N} x_n}{\sum_{n=0}^{N} x_n}$$

where N is the number of analyzed discrete spectral frequencies.

The smooth polynomial curve of the genuine symbol metric signatures (arising from the by-magnitude sorting) yields recognizable characteristics in the spectral signature when analyzed in the frequency domain. A candidate symbol, when the metrics data are extracted in the same order as prescribed by the genuine signature data, will present a similar spectral energy distribution if the symbol is genuine. In other words, the genuine sort order "agrees" with the candidate's metric magnitudes. Disagreement in the sorted magnitudes, or other superimposed signals (such as photocopying artifacts), tend show up as high-frequency components that are otherwise absent in the genuine symbol spectra, thus providing an additional measure of symbol authenticity. This addresses the possibility that a counterfeit autocorrelation series might still satisfy the minimum statistical match threshold of the genuine symbol. This is a remote possibility, but can conceivably happen when using normalized correlation if the overall range of the data is large compared to the magnitude of the errors between individual data points and the natural sort order of the dominant metric magnitudes happens to be close to that of the genuine symbol. The distribution characteristics of the DFT power series of such a signal will reveal the poor quality of the match via the high frequencies present in the small amplitude match errors of the candidate series. Such a condition could be indicative of a photocopy of a genuine symbol. In specific terms, here we expect a high Kurtosis and a high Distribution Ratio in the spectra of a genuine symbol.

Along with the autocorrelation match score, one can make use of this power series distribution information as a measure of "confidence" in the verification of a candidate symbol.

Figure 13:
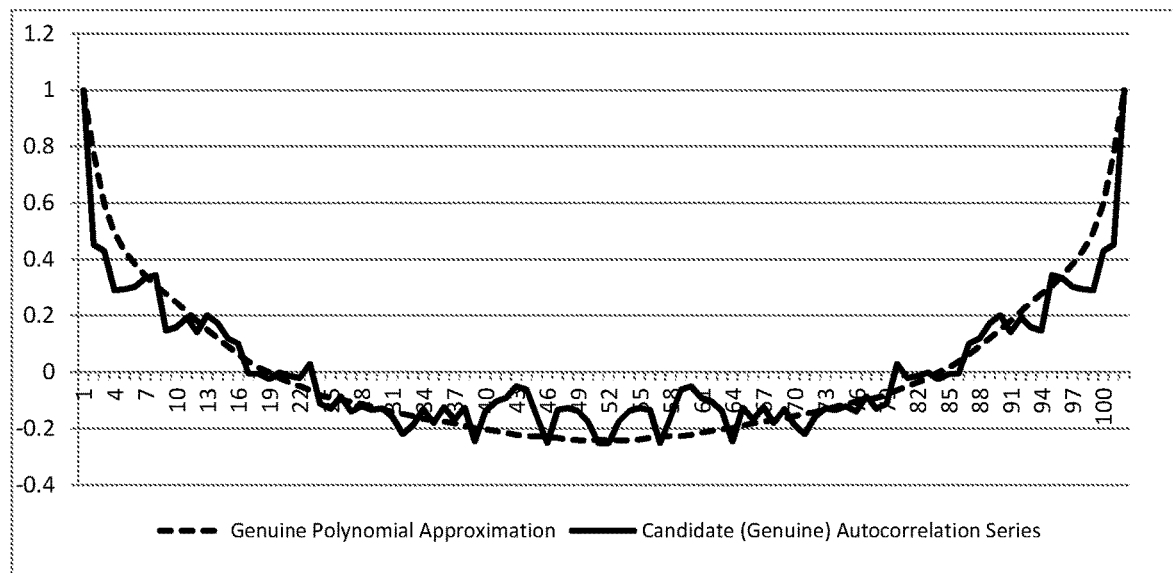
FIG. 13 is a graph of a polynomial approximation of an autocorrelation series for a genuine item with a genuine "candidate" symbol.

FIG. 13 shows a comparison of the autocorrelation series for a single metric between a genuine item (polynomial approximation) and a candidate symbol (genuine in this case). Note the close agreement-here the correlation between the two autocorrelation series exceeds 93%.

Figure 14:
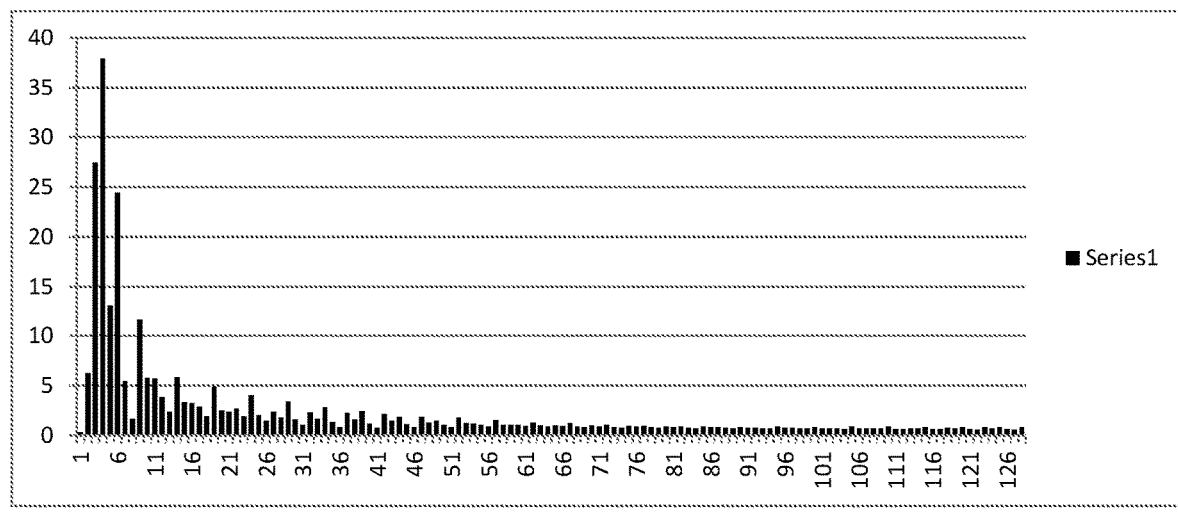
FIG. 14 is a chart of a power series for the genuine data in FIG. 13.

FIG. 14 is a power series from the original genuine autocorrelation data used for FIG. 13. It can clearly be seen that the spectrum is dominated by low frequencies.

Figure 15:
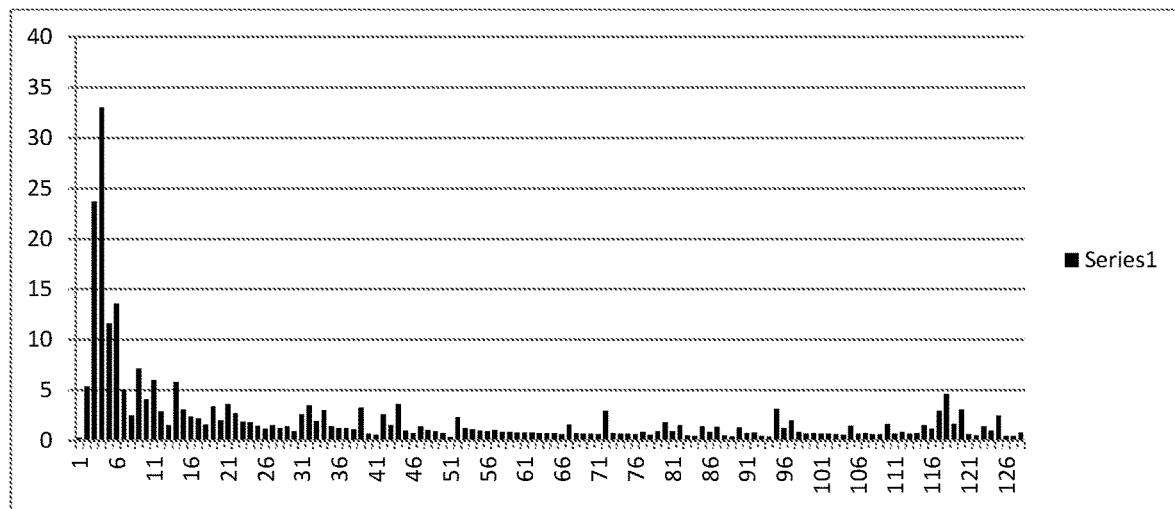
FIG. 15 is a chart similar to FIG. 14 for the "candidate" data in FIG. 13.

FIG. 15 is a power series similar to FIG. 14 from a cell phone acquired image of the genuine item of FIG. 14. Some image noise is present, but the overall power spectrum closely matches the genuine spectrum, with the same dominance of low frequency components.

Figure 16:
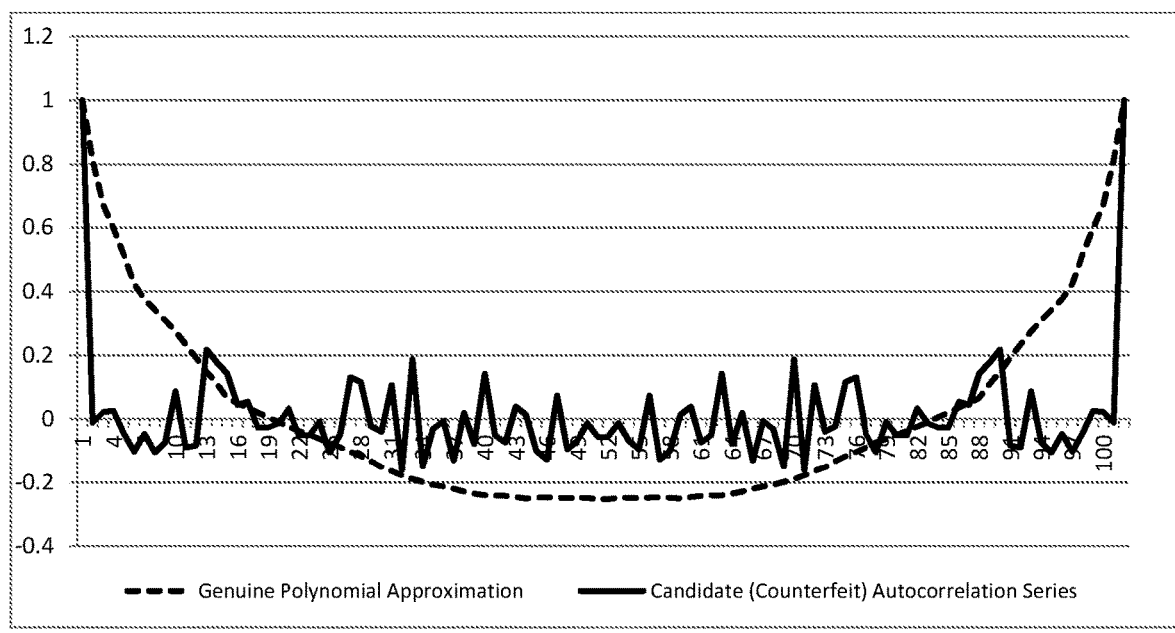
FIG. 16 is a graph similar to FIG. 14 for a counterfeit "candidate" symbol.

FIG. 16 shows a comparison of the autocorrelation series for a single metric between the polynomial approximation for a genuine item and a candidate symbol (here a counterfeit). There is considerable disagreement, and the candidate autocorrelation is noticeably more jagged than in FIG. 13. The numeric correlation between the two series is low (<5%), and the jagged shape of the data is also apparent in the DFT analysis (below).

Figure 17:
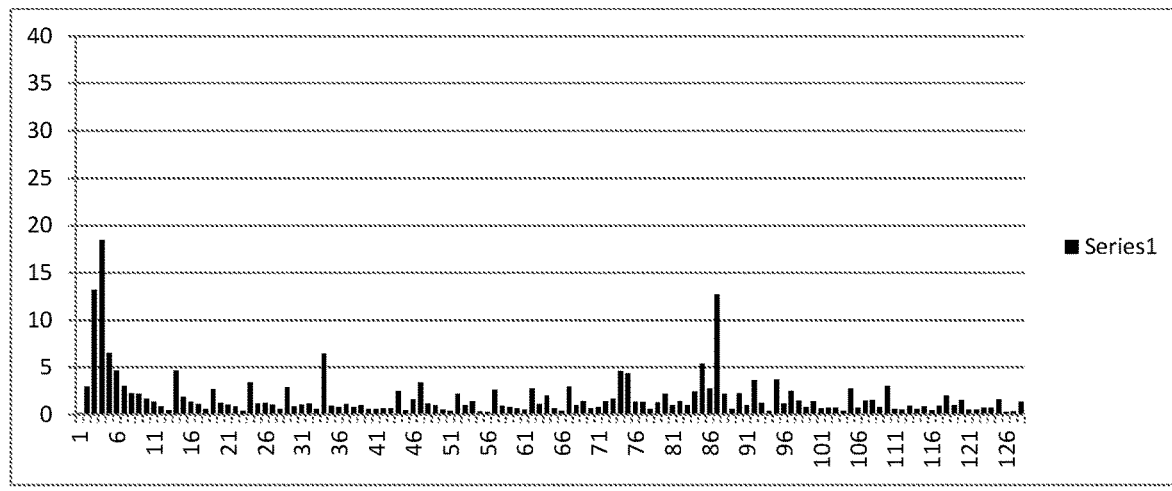
FIG. 17 is a chart similar to FIG. 14 for the counterfeit data used in FIG. 16.

FIG. 17 shows the power series from the cell phone acquired image of the counterfeit symbol of plot 4. Note how the low frequency components are diminished with the total spectral energy now spread out to include significant portions of the higher frequency range.

Alternate Embodiment Using String Literal Comparisons

Figure 18:
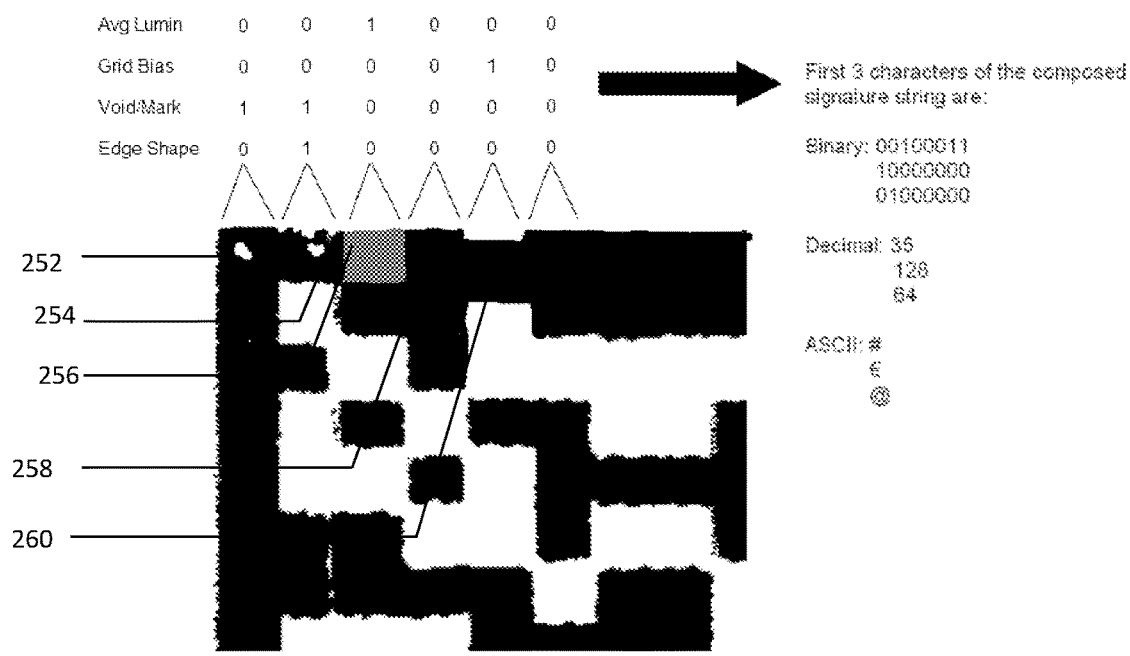
FIG. 18 is a diagram of part of a 2-D data matrix, illustrating an encoding process.

Referring now to FIG. 18, in some implementations it is desirable to avoid the use of computationally intensive methods such as numeric correlation or other statistical operations. In other instances, the mark being used for signature extraction may not be a data carrying symbol, or may be a symbol with limited data capacity, that does not allow for the association of the mark signature metrics with a unique identifier, such as a serial number. In an alternate embodiment, the signature data for the mark may be encoded as a string of bytes, which may be visualized as ASCII characters, rather than the numeric magnitude data used in the above example. This alternate data format provides the ability to use the signature data directly to look-up a particular mark (e.g., in a database) as would normally be done using a serial number in the case of a data carrying symbol. When encoding the mark data as a literal string of ASCII characters, the signature ASCII data itself becomes the unique identifier information for the mark, acting as would a serial number for example as in the case of a data carrying symbol.

In this embodiment, rather than storing the location and magnitude of each signature metric for a mark, what is stored is the presence (or absence) of significant signature features and each of the evaluated locations within a mark. For example, in the case of a 2-D Data Matrix symbol that does not carry/encode a unique identifier/serial number, the signature data may be stored as a string of characters, each encoding the presence/absence of a feature exceeding the minimum magnitude threshold for each signature metric in a module, but not encoding further data about the magnitude or number of features in any one metric. In this example, each module in the symbol has 4 bits of data, one bit for each of the signature metrics, where a "1" indicates that the particular metric signature has a significant feature at that module location. Therefore, in this example, every possible combination of the four metrics extracted and tested against the magnitude limit minima may be encoded in one half byte per module: 0000 (hexadecimal 0) through 1111 (hexadecimal F), with 0000 meaning that none of the tested signature metrics are present to a degree greater than the magnitude minimum in that particular module and 1111 meaning that all four of the tested signature metrics are present to a degree greater than the magnitude minimum in that particular module.

In the example of a 2-D data matrix 250 shown in FIG. 18, the first six modules are coded as follows. A first module 252 has no artifact for average luminance: it is satisfactorily black. It has no grid bias. It does have a large white void. It has no edge shape artifact: its edges are straight and even. It is thus coded 0010. A second module 254 has a void and an edge shape artifact, and is coded 0011. A third module 256 is noticeably gray rather than black, but has no other artifacts, and is coded 1000. A fourth module 258 has no artifacts, and is coded 0000. A fifth module 260 has a grid bias but no other artifacts, and is coded 0100. A sixth module has no artifacts, and is coded 0000. Thus, the first six modules are coded as binary 00100011 10000000 01000000, or hexadecimal 238040, or decimal 35-128-64, or ASCII # E @. (Some ASCII codes, especially those in the extended range from decimal 128-255, have variable character assignments. That is not important for the present implementation, because they are never actually expressed as human-readable characters.)

Analysis Under the String Literal Encoding Embodiment

Signature metrics of the genuine mark are stored as an ASCII string, encoding the signature data as described above. Using a 2-D Data Matrix code as an example, with a typical symbol size of 22×22 modules, the ASCII string portion containing the unique signature data would be 242 characters in length, assuming the data is packed 2 modules per character (byte). The signature strings of genuine marks are stored in a database, flat file, text document or any other construct appropriate for storing populations of distinct character strings. The stored data may be on local storage where it is expected to be needed, or may be searchable over a network on any connected data storage server or device.

In this example, the process by which a candidate mark is evaluated to determine if it is genuine is as follows:

1. The candidate symbol is analyzed and its signature ASCII string extracted.
2. This signature string is used as a search query of the stored genuine signature data to attempt to find a match within the genuine signature data set.
3. The stored data is subjected to a test for an exact match of the complete candidate search string. If a complete string match is not found, an approximate match may be sought, either by searching for sub-strings or by a "fuzzy match" search on the whole strings. Algorithms to search a candidate string against a database of reference strings, and return the identity of the best match(es) and the percentage identity, are well known and, in the interests of conciseness, will not be further described here.
4. Where the search returns a match to one reference string of at least a first, minimum confidence match threshold, the original and candidate symbols may be accepted as the same. Where the search returns no string with a percentage match above a second, lower threshold, the candidate symbol may be rejected as counterfeit or invalid.
5. Where the search returns one reference string with a percentage match between the first and second thresholds, the result may be deemed to be indeterminate. Where the search returns two or more reference strings with a percentage match above the second threshold, the result may be deemed to be indeterminate, or a further analysis may be conducted to match the candidate string with one or other of the reference strings.
6. When the result is indeterminate, the user submitting the symbol for verification may be prompted to re-submit another image of the symbol for processing. Instead, or in addition, the signature extraction method may employ a retry method for encoding the individual features in the original image. The retry method may be applied to any module whose signature data in the candidate symbol is close to the magnitude minimum threshold for that metric. (In this embodiment, the signature data magnitude is not available for the stored original symbols.) If the symbol being analyzed uses an error correction mechanism, the retry method may be applied to any module in a symbol, or part of the symbol, that the error correction mechanism indicates as possibly damaged or altered. Instead, or in addition, any signature data with a magnitude that is close to that minimum magnitude threshold may be de-emphasized, for example, by searching with its presence bit asserted (set to 1) and then again with the bit un-asserted (set to 0), or by substituting a "wild-card" character. Alternatively, the percentage match query may be recomputed giving reduced or no weight to those bits representing features that are close to the threshold.
7. Once completed successfully, the results of the comparison analysis are reported. These results may be displayed locally or transferred to a networked computer system or other device for further action. Indeterminate results may be reported as such.

The advantages of embodiments described herein include, without limitation, the ability to uniquely identify an item by using a mark that has been placed on the item for another purpose, without the need to specifically introduce overt or covert elements for the purposes of anti-counterfeiting. A further advantage is that such identification can be very difficult to counterfeit. Further advantages include the ability to integrate the functions of the present disclosure into existing technologies commonly used to read barcode symbols, such as machine vision cameras, bar code readers and consumer "smart phones" equipped with cameras, without altering the primary behavior, construction or usability of the devices. Another advantage, in the case of a 2-dimensional barcode for example, is the ability to use the signature data as a means of providing a redundant data-carrier for the purpose of identifying an item.

In an instance where damage to the candidate mark makes it only partially readable, or makes it impossible to read and/or decode a data-carrying symbol, or the like, undamaged identifying features of only a portion of the mark may be sufficient to identify the mark. Once the candidate mark is thus identified with a genuine mark, the signature of the genuine mark can be retrieved from storage, and any information that was incorporated into the signature, such as a serial number of the marked item, may be recovered from the retrieved signature instead of directly from the damaged mark. Thus, the signature data, either in combination with partially recovered encoded symbol information or not, can be used to uniquely identify an item. This has many advantages, particularly considering how a data carrying mark may be damaged during a marked item's transit through a manufacturer's supply chain. This challenge has commonly been addressed by ensuring a data carrier is created with a very high quality or "grade" at the point of marking. The goal was to produce a mark of such high quality that it will still be fully readable even after undergoing significant degradation due to physical damage in the supply chain. That put an excessive burden of cost and reduced manufacturing yields on the producer of the item as he endeavored to ensure that only marks of the highest quality entered his supply chain. The present embodiment has the advantage of removing the need for producing marks of the highest quality while still providing a way of identifying unreadable marks that cannot be decoded in the normal way because of symbol damage.

As mentioned above, a symbol other than a 1-D or 2-D barcode may be used as a target symbol. A company logo, for example, may function as the target symbol. The features, and the specific variations in those features, that are used as signature metrics are almost limitless. In some embodiments, the mark need not be applied with a view to extracting signature data according to the present methods. Instead, a mark that had already been created could be used, provided that it contains suitable artifact features.

Where an original mark is applied to an original item, and/or an original item is appended to an original object, the mark or item may contain information about the item or object. In that case, the above-described methods and systems may include verifying information about the item or object that is included in the mark or item, even when the underlying item or object is not physically replaced or altered. For example, where an object is marked with an expiry date, it may be desirable to reject an object with an altered expiry date as "not authentic" even if the object itself is the original object. Embodiments of the present systems and methods will produce that result, if the artifacts used for verification are found in the expiry date, for example, as imperfections of printing. Other information such as lot numbers and other product tracking data may similarly be verified.

Various embodiments have been described in terms of acquiring an entire 2-D barcode for signature data. However, the mark may be divided into smaller zones. Where the original mark is large enough, and has enough artifacts that are potential signature data, only one, or fewer than all, zones may be acquired and processed. Where more than one zone is acquired and processed, the signature data from different zones may be recorded separately. That is especially useful if the mark is a symbol encoding data with error correction, and the error correction relates to zones smaller than the entire symbol. Then, if the error correction indicates that part of the candidate symbol is damaged, the signature data from the damaged part can be disregarded.

Although the embodiments have been described primarily in terms of distinguishing an original mark (and by implication an original item to which that mark is applied or attached) from a counterfeit copy of the mark, the present methods, apparatus, and products may be used for other purposes, including distinguishing between different instances of the original mark (and item).

In the interests of simplicity, specific embodiments have been described in which the artifacts are defects in printing of a printed mark, applied either directly to the item that is to be verified, or to a label applied to an object that is to be verified. However, as has already been mentioned, any feature that is sufficiently detectable and permanent, and sufficiently difficult to duplicate, may be used.

Some of the embodiments have been described as using a database of signature data for genuine items, within which a search is conducted for a signature data that at least partially matches the signature data extracted from a candidate mark. However, if the candidate item is identified as a specific genuine item in some other way, a search may be unnecessary, and the signature data extracted from the candidate mark may be compared directly with the stored signature data for the specific genuine item.

In view of the many possible embodiments to which the principles of the present discussion may be applied, it should be recognized that the embodiments described herein with respect to the drawing figures are meant to be illustrative only and should not be taken as limiting the scope of the claims. Therefore, the techniques as described herein contemplate all such embodiments as may come within the scope of the following claims and equivalents thereof.

What is claimed is:

1. A method for determining whether a candidate barcode is genuine, the method comprising:
    acquiring an image of an original barcode, wherein the original barcode includes a plurality of modules;
    determining, from the image of the original barcode, a deviation of a position of at least one of the plurality of modules of the original barcode from an idealized grid;
    encoding the deviation as signature data for the original barcode;
    storing the signature data for the original barcode on a storage device;
    acquiring an image of the candidate barcode, wherein the candidate barcode includes a plurality of modules;
    determining, from the image of the candidate barcode, a deviation of a position of at least one of the plurality of modules of the candidate barcode from the idealized grid;
    retrieving the signature data for the original barcode from the storage device;
    comparing the signature data for the original barcode with signature data for the candidate barcode; and
    making a determination that the candidate barcode is genuine or not genuine based on a result of the comparison.

2. The method of claim 1, further comprising applying the original barcode to an item prior to acquiring the image of the original barcode.

3. The method of claim 2, wherein applying the original barcode to an item comprises applying the barcode to a label, the method further comprising applying the label to an object.

4. The method of claim 2, wherein applying the original barcode to an item comprises applying the barcode to an object.

5. The method of claim 1, wherein acquiring the image of the candidate barcode comprises receiving the image of the candidate barcode from a cell phone.

6. The method of claim 1, further comprising reading the original barcode to obtain an identifier, wherein storing the signature data for the original barcode on the storage device comprises indexing the signature data for the original barcode using the identifier.

7. The method of claim 1, further comprising reading the original barcode to obtain an identifier, wherein retrieving the signature data for the original barcode comprises using the identifier to look up the signature data for the original barcode.

* * * * *